(12) United States Patent
Hasse et al.

(10) Patent No.: US 9,446,347 B2
(45) Date of Patent: Sep. 20, 2016

(54) METHOD OF OBTAINING CARBON DIOXIDE FROM A CARBON DIOXIDE-CONTAINING GAS MIXTURE

(71) Applicant: L'Air Liquide, Societe Anonyme pour l'Etude et l'Exploitation des Procedes Georges Claude, Paris (FR)

(72) Inventors: David J. Hasse, Middletown, DE (US); Sudhir S. Kulkarni, Wilmington, DE (US); Edgar S. Sanders, Jr., Newark, DE (US); Jean-Pierre Tranier, L'Hay-Les_Roses (FR); Paul Terrien, Philadelphia, PA (US)

(73) Assignee: L'Air Liquide Société Anonyme Pour L'Étude Et L'Exploitation Des Procedes Georges Claude, Paris (FR)

(*) Notice: Subject to any disclaimer, the term of this patent is extended or adjusted under 35 U.S.C. 154(b) by 0 days.

(21) Appl. No.: 14/132,600

(22) Filed: Dec. 18, 2013

(65) Prior Publication Data
US 2014/0102298 A1    Apr. 17, 2014

Related U.S. Application Data

(63) Continuation of application No. 12/828,293, filed on Jul. 1, 2010, now Pat. No. 8,617,292.

(60) Provisional application No. 61/286,707, filed on Dec. 15, 2009, provisional application No. 61/357,597, filed on Jun. 23, 2010, provisional application No. 61/358,865, filed on Jun. 25, 2010.

(51) Int. Cl.
*B01D 53/22*    (2006.01)
*B01D 71/64*    (2006.01)
(Continued)

(52) U.S. Cl.
CPC .......... *B01D 53/228* (2013.01); *B01D 53/229* (2013.01); *B01D 71/64* (2013.01);
(Continued)

(58) Field of Classification Search
CPC ............... B01D 53/228; B01D 71/64; B01D 2257/504; B01D 53/229; F25J 3/067
USPC ......... 95/39, 51; 96/4, 14; 62/602, 617, 621, 62/624, 629, 928, 606; 60/783
See application file for complete search history.

(56) References Cited

U.S. PATENT DOCUMENTS 4,542,010 A * 9/1985 Roman ................ B01D 53/228
                                                                95/54
4,639,257 A    1/1987 Duckett et al.
(Continued)

FOREIGN PATENT DOCUMENTS

EP    0 422 885    4/1991
EP    1 287 874    3/2003
(Continued)

OTHER PUBLICATIONS

Bos, A. et al., "Suppression of Gas Separation Membrane Plasticization by Homogeneous Polymer Blending", AIChE Journal, vol. 47, No. 5, May 2001, pp. 1088-1093.*
(Continued)

*Primary Examiner* — Jason M Greene
(74) *Attorney, Agent, or Firm* — Christopher J. Cronin

(57) ABSTRACT

Disclosed are methods of obtaining carbon dioxide from a $CO_2$-containing gas mixture. The methods combine the benefits of gas membrane separation with cryogenic temperatures.

12 Claims, 14 Drawing Sheets

(51) Int. Cl.
*F25J 3/06* (2006.01)
*B01D 53/00* (2006.01)

(52) U.S. Cl.
CPC ............ *F25J 3/067* (2013.01); *B01D 53/002* (2013.01); *B01D 2257/504* (2013.01); *F25J 2205/20* (2013.01); *F25J 2205/40* (2013.01); *F25J 2205/80* (2013.01); *F25J 2210/04* (2013.01); *F25J 2210/70* (2013.01); *F25J 2215/04* (2013.01); *F25J 2220/82* (2013.01); *F25J 2230/08* (2013.01); *F25J 2230/30* (2013.01); *F25J 2230/80* (2013.01); *F25J 2235/80* (2013.01); *F25J 2240/80* (2013.01); *F25J 2240/90* (2013.01); *F25J 2245/02* (2013.01); *F25J 2270/02* (2013.01); *F25J 2270/06* (2013.01); *Y02C 10/10* (2013.01); *Y02C 10/12* (2013.01)

(56) References Cited

U.S. PATENT DOCUMENTS

| | | | |
|---|---|---|---|
| 4,902,422 | A | 2/1990 | Pinnau et al. |
| 4,944,775 | A | 7/1990 | Hayes |
| 4,990,168 | A * | 2/1991 | Sauer et al. ...................... 95/51 |
| 5,015,270 | A * | 5/1991 | Ekiner et al. ..................... 95/54 |
| 5,071,448 | A | 12/1991 | Bikson et al. |
| 5,085,676 | A * | 2/1992 | Ekiner et al. ..................... 96/10 |
| 5,233,837 | A | 8/1993 | Callahan |
| 5,234,471 | A * | 8/1993 | Weinberg .......................... 95/51 |
| 5,352,272 | A * | 10/1994 | Moll et al. .......................... 96/9 |
| 5,647,227 | A * | 7/1997 | Lokhandwala ..................... 96/4 |
| 5,679,133 | A | 10/1997 | Moll et al. |
| 5,753,010 | A * | 5/1998 | Sircar et al. ...................... 95/51 |
| 5,837,032 | A | 11/1998 | Moll et al. |
| 5,964,923 | A | 10/1999 | Lokhandwala |
| 6,425,267 | B1 * | 7/2002 | Baker .................. B01D 53/228 95/50 |
| 6,695,043 | B1 | 2/2004 | Wagner et al. |
| 7,862,788 | B2 | 1/2011 | Gal et al. |
| 8,617,292 | B2 * | 12/2013 | Hasse et al. ...................... 95/51 |
| 2008/0000350 | A1 * | 1/2008 | Mundschau .......... B01D 53/226 95/55 |
| 2008/0072762 | A1 | 3/2008 | Gal |
| 2008/0134660 | A1 | 6/2008 | Finkenrath et al. |
| 2009/0013717 | A1 | 1/2009 | Darde et al. |
| 2009/0013868 | A1 | 1/2009 | Darde et al. |
| 2009/0013871 | A1 | 1/2009 | Darde et al. |
| 2009/0148930 | A1 | 6/2009 | Gal et al. |
| 2009/0211733 | A1 | 8/2009 | Tranier et al. |
| 2010/0236404 | A1 * | 9/2010 | Baker et al. ...................... 95/51 |
| 2010/0263529 | A1 | 10/2010 | Alban et al. |
| 2010/0322843 | A1 | 12/2010 | Court et al. |
| 2011/0035942 | A1 | 2/2011 | Crayssac et al. |
| 2011/0036548 | A1 | 2/2011 | Crayssac et al. |
| 2011/0041687 | A1 * | 2/2011 | Diaz et al. ........................ 95/51 |

FOREIGN PATENT DOCUMENTS

| | | |
|---|---|---|
| EP | 1 952 874 | 8/2008 |
| FR | 2 930 465 | 10/2009 |
| FR | 2 930 466 | 10/2009 |
| GB | 2 282 082 | 3/1995 |
| WO | WO 93/50331 | 11/1998 |
| WO | WO 2009 010690 | 1/2009 |
| WO | WO 2009 095 581 | 8/2009 |
| WO | WO 2010 076 463 | 7/2010 |
| WO | WO 2010 076 464 | 7/2010 |

OTHER PUBLICATIONS

Bhole, Y.S., et al., "Nitration and amination of polyphenylene oxide: Synthesis, gas sorption and permeation analysis," European Polymer Journal, 43 (2007) pp. 1450-1459.

Bos, A., et al., "CO2-induced plasticization phenomena in glassy polymers," Journal of Membrane Science, vol. 155, Issue 1, Mar. 31, 1999, pp. 67-78.

Camacho-Zuniga, C., et al., "Aromatic Polysulfone Copolymers for Gas Separation Membrane Applications," Journal of Membrane Science, 340, (2009), pp. 221-226.

Guzman-Gutierrez, M.T., et al., "Synthesis and Gas Transport Properties of New Aromatic 3F Polymers," Journal of Membrane Science, 323, (2008), pp. 379-385.

Ismail, A.F., et al., "Penetrant-Induced Plasticization Phenomenon in Glassy Polymers for Gas Separation Membrane," Separation and Purification Technology, vol. 27, Issue 3, Jun. 1, 2002, pp. 173-194.

Kanehashi, S., "Effects of Carbon Dioxide-Induced Plasticization on the Gas Transport Properties of Glassy Polyimide Membranes," Journal of Membrane Science, 298, (1-2), 2007, pp. 147-155.

Kim, J.H., et al., "Effects of CO2 Exposure and Physical Aging on the Gas Permeability of Thin 6FDA-Based Polyimide Membranes: Part 1, without cross-linking," Journal of Membrane Science, 262, (1-2), 2006, pp. 21, 31.

U.S. Appl. No. 13/139,003, "Method for Trapping Carbon Dioxide by Cryocondensation," filed Jun. 10, 2011.

U.S. Appl. No. 13/133,652, "Carbon Dioxide Recovery Method Using Cryo-Condensation," filed Jun. 9, 2011.

International Search Report and Written Opinion for PCT/US2010/060559, mailed Jul. 8, 2011.

* cited by examiner

| Stream # | 1 | 5 | 17 | 31 | 46 | 42 | 36 | 75 | 65 | 56 |
|---|---|---|---|---|---|---|---|---|---|---|
| Temp [C] | 57.2 | 6.5 | 10 | -30 | -34.5 | -34.5 | -55 | -55 | -55 | 58 |
| Pressure [bar] | 1 | 16.1 | 16 | 16 | 1.7 | 15.8 | 20.9 | 20.9 | 20.9 | 1.0 |
| Molar Flow [Nm³/h] | 1000 | 834 | 938 | 938 | 229 | 710 | 229 | 124 | 105 | 710 |
| Mass Flow [kg/h] | 1279 | 1146 | 1302 | 1302 | 398 | 904 | 398 | 241 | 157 | 904 |
| Mole Fractions | | | | | | | | | | |
| $N_2$ | 66.95% | 80.25% | 77.74% | 77.74% | 27.43% | 93.95% | 27.43% | 2.12% | 57.37% | 93.95% |
| $O_2$ | 2.32% | 2.78% | 3.64% | 3.64% | 5.06% | 3.18% | 5.06% | 0.57% | 10.37% | 3.18% |
| Argon | 0.80% | 0.96% | 0.99% | 0.99% | 0.63% | 1.11% | 0.63% | 0.10% | 1.26% | 1.11% |
| $CO_2$ | 13.30% | 15.93% | 17.63% | 17.63% | 66.88% | 1.76% | 66.88% | 97.20% | 31.00% | 1.76% |
| $H_2O$ | 16.63% | 0.08% | 0.00% | 0.00% | 0.00% | 0.00% | 0.00% | 0.00% | 0.00% | 0.00% |

FIG 2B

| Stream # | 1 | 5 | 17 | 31 | 37 | 46 | 42 | 36 | 75 | 65 | 56 |
|---|---|---|---|---|---|---|---|---|---|---|---|
| Temp [C] | 57.2 | 6.5 | 10 | -40 | -40 | -40 | -41.9 | -55 | -55 | -55 | 52.5 |
| Pressure [bar] | 1 | 16.1 | 16.1 | 16 | 1.72 | 1.7 | 15.7 | 19.9 | 19.9 | 19.9 | 1 |
| Molar Flow [Nm³/h] | 1000 | 834.2 | 942.9 | 942.9 | 29.6 | 232.4 | 739.6 | 232.4 | 123.1 | 109.3 | 710 |
| Mass Flow [kg/h] | 1278.9 | 1145.6 | 1308.9 | 1308.9 | 37.7 | 403.5 | 942.2 | 403.5 | 239.6 | 163.9 | 904.5 |
| Mole Fractions | | | | | | | | | | | |
| N₂ | 66.95% | 80.25% | 77.83% | 77.83% | 93.93% | 28.80% | 93.93% | 28.80% | 2.07% | 58.89% | 93.93% |
| O₂ | 2.32% | 2.78% | 3.37% | 3.37% | 3.19% | 3.89% | 3.19% | 3.89% | 0.41% | 7.82% | 3.19% |
| Argon | 0.80% | 0.96% | 0.97% | 0.97% | 1.11% | 0.54% | 1.11% | 0.54% | 0.08% | 1.06% | 1.11% |
| CO₂ | 13.30% | 15.93% | 17.83% | 17.83% | 1.77% | 66.77% | 1.77% | 66.77% | 97.43% | 32.24% | 1.77% |
| H₂O | 16.63% | 0.08% | 0.00% | 0.00% | 0.00% | 0.00% | 0.00% | 0.00% | 0.00% | 0.00% | 0.00% |

FIG 9B

METHOD OF OBTAINING CARBON DIOXIDE FROM A CARBON DIOXIDE-CONTAINING GAS MIXTURE

CROSS-REFERENCE TO RELATED APPLICATIONS

This application is a continuation of U.S. patent application Ser. No. 12/828,293, filed Jul. 1, 2010, which claims the benefit of U.S. Provisional Application No. 61/286,707 filed Dec. 15, 2009, U.S. Provisional Application No. 61/357,597 filed Jun. 23, 2010, and U.S. Provisional Application No. 61/358,865 filed Jun. 25, 2010, each of the disclosures of which are incorporated herein by reference.

BACKGROUND

Membranes have been proposed to separate $CO_2$ from other components in effluent gas streams. The recovery of carbon dioxide from effluent gas streams is propelled by multiple factors including the industrial carbon dioxide market, enhanced oil recovery (EOR), and governmental and industrial efforts to reduce greenhouse gas emissions reduction.

Many methods exist to remove $CO_2$ from other components in effluent gas streams. When the effluent gas streams contain a high amount of $CO_2$, the stream may be cooled to provide a liquid $CO_2$ product. When the effluent gas streams contain a low amount of $CO_2$, various methods have been used to increase the $CO_2$ content prior to cooling, such as membrane separation or adsorption. Often when multiple methods are used, integration of the two methods to obtain more efficient energy savings has been overlooked. For example, U.S. Pat. No. 4,639,257 discloses recovery of carbon dioxide from a gas mixture using membrane separation and distillation. However, each step is effectively performed in isolation, with temperature and pressure adjustments before each membrane and distillation process. As disclosed in the '257 patent, the gas temperature and pressure for membrane separation is approximately 300 K (26.85° C.) and approximately 28 bar, respectively, whereas that for distillation is approximately −3° C. (270.15 K) to −40° C. (233.15 K) and approximately 1 to 3 bar, respectively. The energy requirements for such a process make it inefficient.

According to the U.S. Department of Energy, no current technology removes at least 90% of the $CO_2$ from flue gases of existing pulverized coal (PC) power plants with less than a 35% increase in the cost of electricity. [DOE 2007]. The need remains for an economical, integrated $CO_2$ recovery process.

SUMMARY

There is disclosed a method of obtaining carbon dioxide from a $CO_2$-containing gas mixture. The method includes the following steps. A $CO_2$-containing gas mixture is obtained. The gas mixture is cooled. The cooled gas mixture is allowed to flow into a gas separation membrane module made of a polymeric material to produce a carbon dioxide-rich stream and a carbon dioxide-lean stream. The polymeric material has a $CO_2$ solubility at 35° C. and 10 bar pressure of >0.03 [($cm^3$ of $CO_2$ at STP)/($cm^3$ of polymeric material) (cmHg)] and a glass transition temperature of >210° C. The carbon dioxide-rich stream is compressed. The compressed carbon dioxide-rich stream is at least partially condensed through cooling. The cooled, compressed carbon dioxide-rich stream is subjected to cryogenic phase separation to produce a $CO_2$ rich liquid and a $CO_2$ lean vapor stream.

There is disclosed another method of obtaining carbon dioxide from a $CO_2$-containing gas mixture. The method includes the following steps. A $CO_2$-containing gas mixture is obtained. The gas mixture is cooled. The cooled gas mixture is allowed to flow into a gas separation membrane module made of a polymeric material to produce a carbon dioxide-rich stream and a carbon dioxide-lean stream. The gas separation membrane has a permeability of oxygen in Barrers of less than $2000/(\text{selectivity})^{3.5}$ for a gas mixture of 80 mole percent nitrogen and 20 mole percent oxygen at a temperature of 30° C. and at a pressure on one side of the membrane of 30 psia with a vacuum of less than 1 mm Hg on the other side of the membrane, wherein selectivity is oxygen to nitrogen selectivity. Typically, the selectivity under these conditions is in a range of from approximately 5 to approximately 9. The carbon dioxide-rich stream is compressed. The compressed carbon dioxide-rich stream is at least partially condensed through cooling. The cooled, compressed carbon dioxide-rich stream is subjected to cryogenic phase separation to produce a $CO_2$ rich liquid and a $CO_2$ lean vapor stream.

There is disclosed yet another method of obtaining carbon dioxide from a $CO_2$-containing gas mixture. The method includes the following steps. A $CO_2$-containing gas mixture is obtained. The gas mixture is cooled. The cooled gas mixture is allowed to flow into a gas separation membrane module. A sweep gas is directed to a permeate side of the membrane, the sweep gas having a low $CO_2$ concentration. A carbon dioxide-rich permeate is recovered from the membrane. A carbon dioxide-lean non-permeate is recovered from the membrane.

There is disclosed yet another method of obtaining carbon dioxide from a $CO_2$-containing gas mixture. The method includes the following steps. A $CO_2$-containing gas mixture is obtained. The gas mixture is cooled in a heat exchanger. The cooled gas mixture is allowed to flow into a gas separation membrane module to produce a carbon dioxide-rich permeate and a carbon dioxide-lean non-permeate. The carbon dioxide-lean stream is expanded to produce a cold carbon dioxide-lean stream. The carbon dioxide-rich permeate is compressed. The compressed carbon dioxide-rich permeate is partially condensed via cooling in the heat exchanger. The partially condensed compressed carbon dioxide-rich permeate is separated into a $CO_2$ rich liquid and a $CO_2$ lean vapor stream. Cold energy is provided to the heat exchanger with one or more streams selected from the group consisting of the cold carbon dioxide-lean stream, the $CO_2$ lean vapor stream, and a portion of the $CO_2$ rich liquid.

Any two or more of the above-disclosed methods may be combined to provide an integrated method.

Any of the above-disclosed methods or integrations of any two or more of the above-disclosed integrated methods may include one or more of the following aspects:

the polymeric material is selected from the group consisting of: polyimides; fluoropolysulfones; poly(phenylene oxides); poly(fluorocarbonates); and condensation polymers of 2,2,2-trifluoroacetophenone and either biphenyl or terphenyl ether.

the polymeric material is a polyimide polymer or copolymer having repeating units of formula (I):

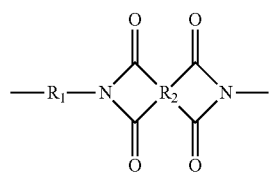

(I)

wherein:

each R₂ is a moiety independently selected from the group of consisting of formula (A), formula (B), formula (C) formula (D) and mixtures thereof

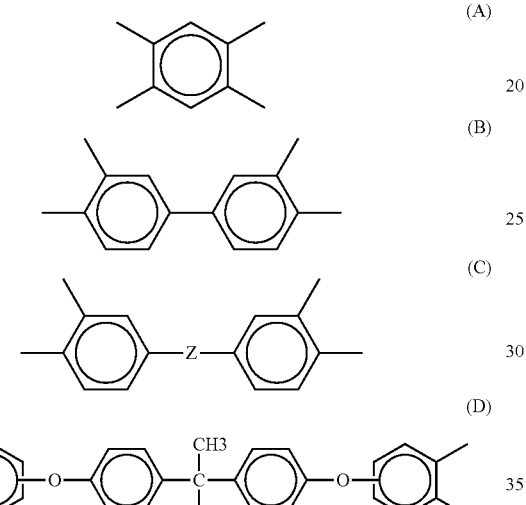

each Z is a moiety independently selected from the group consisting of formula (L), formula (M), formula (N) and/or a mixture thereof

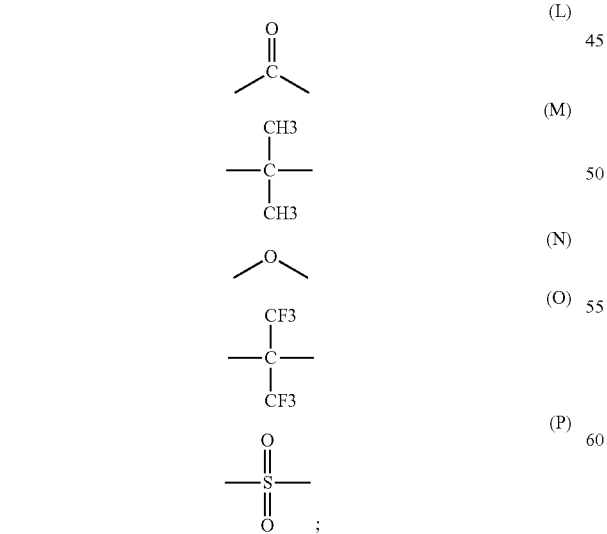

each R₁ is a moiety independently selected from the group consisting of a molecular segment of formula (a), formula (b), formula (c), formula (d), formula (e), formula (f), formula (g), and mixtures thereof

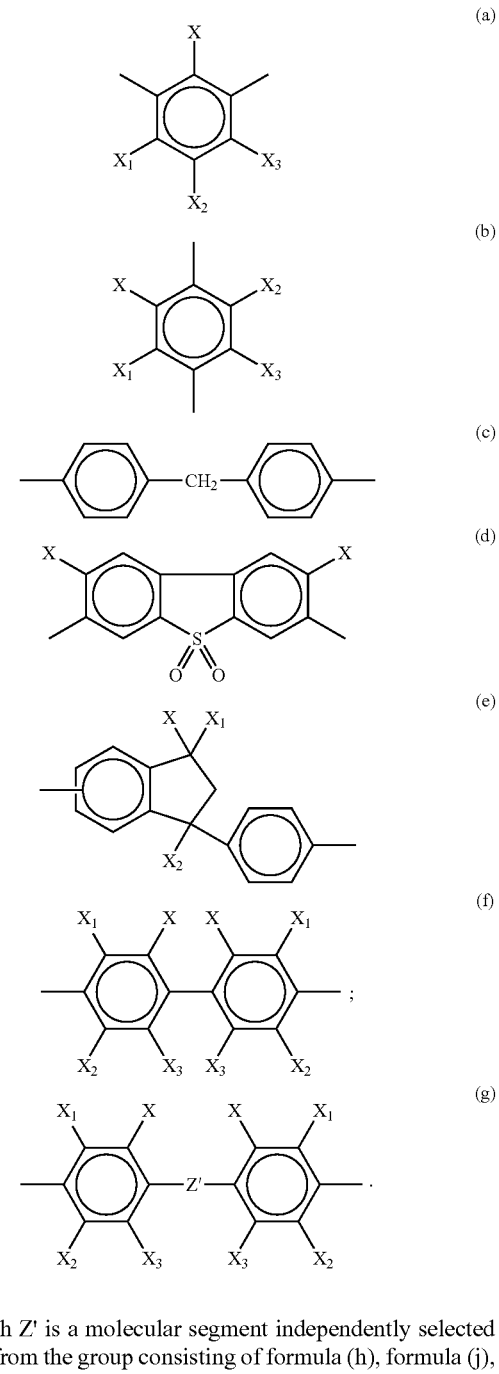

each Z' is a molecular segment independently selected from the group consisting of formula (h), formula (j), formula (k), formula (l), and mixtures thereof

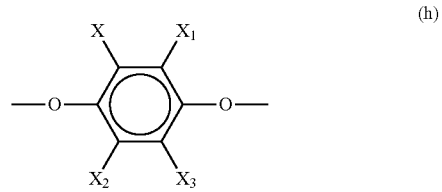

-continued

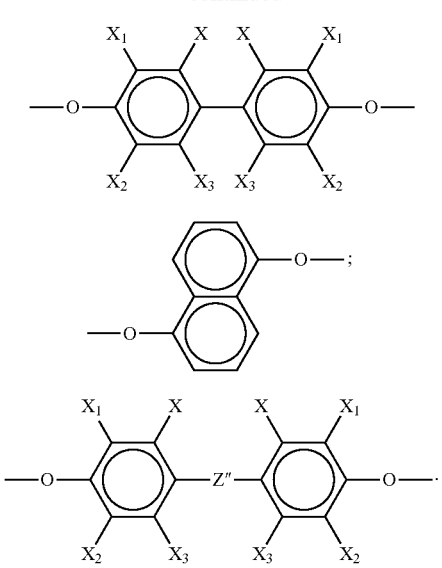

each X, X$_1$, X$_2$, and X$_3$ is independently selected from the group consisting of hydrogen and an alkyl group having 1 to 6 carbon atoms;

each Z" is a moiety independently selected from the group consisting of formula (m) and formula (p)

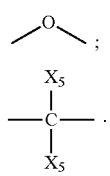

and each X$_5$ is independently selected from the group consisting of hydrogen, an alkyl group having 1 to 6 carbon atoms, and a pefluoroalkyl group having 1 to 6 carbon atoms.

each R$_1$ is a molecular segment of formula (g) and each R$_2$ consists of formula (D).

each R$_1$ is a molecular segment of formula (e) and each R$_2$ consists of formula (D).

each R$_1$ is a molecular segment of formula (e) and each R$_2$ consists of formula (C).

R$_1$ consists of molecular segments of formulae (a) and (e) in a 1:1 ratio and each R$_2$ consists of formula (D).

each R$_1$ is a molecular segment of formula (a) and each R$_2$ consists of formula (C).

each R$_1$ is a molecular segment of formula (a) and each R$_2$ consists of formula (D).

each R$_1$ is a molecular segment of formula (e) and each R$_2$ consists of formula (C).

each R$_1$ is a molecular segment of formula 0 and each R$_2$ consists of formula ( ).

R$_1$ consists of molecular segments of formulae (a) and (c) in a 4:1 ratio and each R$_2$ consists of formula (C).

R$_1$ is of formula (a); X, X$_1$, X$_2$, and X$_3$ are hydrogen; and R$_2$ is of formula (D).

R$_1$ is of formula (r); X, X$_1$, and X$_2$ are methyl groups; R$_2$ is of formula (C); and Z is of formula (L).

R$_1$ consists of molecular segments of formulae (a) and (c) in a 4:1 ratio; R$_2$ is of formula (C); and Z is of formula (L).

the polymeric material is BPDA-ppODA polymerized from 3,3',4,4'-Biphenyltetracarboxylic dianhydride and 4,4'oxydianiline the polymeric material is BTDA-ppODA polymerized from 3,3',4,4'-Benzophenone tetracarboxylic dianhydride and 4,4'oxydianiline.

the polymeric material is PMDA-MDA polymerized from pyromellitic dianhydride and methylene dianiline.

the polymeric material is a polyimide polymerized from pyromellitic dianhydride and 4,4'-oxydianiline.

the polymeric material is 6FDA/BPDA+DAM polymerized from hexafluorobisphenol dianhydride/3,3',4,4'-Biphenyltetracarboxylic dianhydride and diamino mesitylene.

the polymeric material is 6FDA-mpODA polymerized from hexafluorobisphenol dianhydride and 3,4'oxydianiline.

the polymeric material is 6FDA-ppODA polymerized from hexafluorobisphenol dianhydride and 4,4'oxydianiline.

the polymeric material is 6FDA-PDA polymerized from hexafluorobisphenol dianhydride and phenylene diamine.

the polymeric material is 6FDA-IPDA polymerized from hexafluorobisphenol dianhydride and isophorone diamine.

the polymeric material is a polysulfone having repeating units of formula (II)

$$[R_3]_q \quad [R_4]_s \tag{II}$$

wherein:

q=s;

each R$_3$ is a moiety independently selected from the group consisting of a molecular segment of formula t, formula u, and formula v

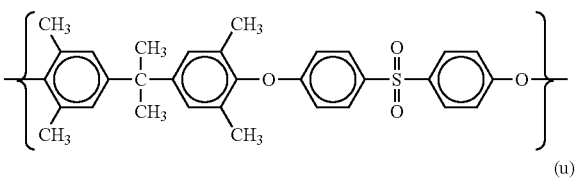

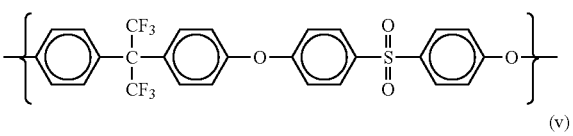

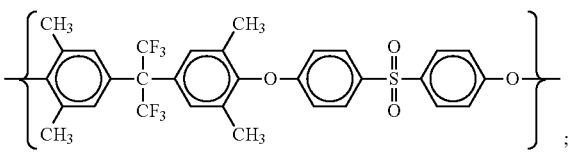

and

R$_4$ consists of a molecular segment of formula (w):

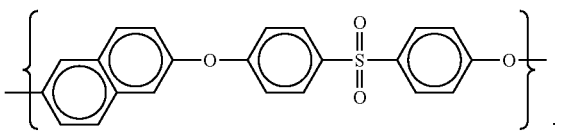

the polysulfone has an $R_3$ of formula (t) and is polymerized from 2,6-dihydroxynaphthalene, tetramethyl bisphenol-A, and bis(4-fluorophenyl)sulfone.

the polysulfone has an $R_3$ of formula (u) and is polymerized from 2,6-dihydroxynaphthalene, hexafluoro bisphenol, and bis(4-fluorophenyl)sulfone.

the polysulfone has an $R_3$ of formula (v) and is polymerized from 2,6-dihydroxynaphthalene, tetramethyl hexafluorobisphenol, and bis(4-fluorophenyl)sulfone.

the polymeric material is a poly(phenylene oxide) selected from the group consisting of polyphenylene oxide (PPO) of formula (III); $NO_2$-substituted PPO, and $NH_2$-substituted PPO

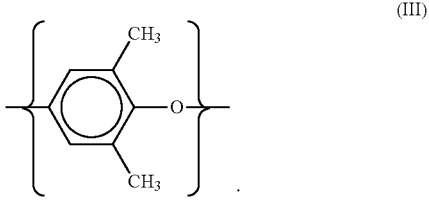

(III)

the polymeric material is a poly(fluorocarbonate) selected from the group consisting of poly(tetrachlorohexafluorocarbonate) and poly(tetrabromohexafluorocarbonate).

the polymeric material is a condensation polymer of 2,2,2-trifluoroacetophenone with biphenyl ether, terphenyl ether or both biphenyl ether and terphenyl ether.

the $CO_2$-containing gas mixture is compressed to a pressure from about 3 bar to about 60 bar prior to the cooling step.

the gas mixture is cooled to a temperature from about 5° C. to about −60° C.

the gas mixture is cooled to a temperature from about −20° C. to about −50° C.

at least 90% of the $CO_2$ in the $CO_2$-containing gas mixture is recovered in the $CO_2$ rich liquid.

the method further comprises the step of expanding the carbon dioxide lean stream to yield a pressure-reduced carbon dioxide lean stream having a temperature of from about −30° C. to about −60° C.

the $CO_2$-containing gas mixture is obtained from the flue gas of a combustion process, from a natural gas stream, or from a $CO_2$ exhaust of an fermentative ethanol production plant.

the $CO_2$-containing gas mixture is obtained from the flue gas of a combustion process and the combustion process is selected from the group consisting of a steam methane reforming (SMR) process, a blast furnace, and air-fired or oxygen-enhanced fossil fuel combustion processes.

the combustion process is an oxygen-enhanced fossil fuel combustion process operated in full oxycombustion or partial oxycombustion mode.

the oxygen-enhanced fossil fuel combustion process is operated in full oxycombustion mode, primary and secondary oxidants thereof being pure oxygen or synthetic air comprising oxygen and recycled flue gas.

the oxygen-enhanced fossil fuel combustion process is operated in partial oxycombustion mode, a primary oxidant thereof being air and a secondary oxidant thereof being synthetic air comprising oxygen and recycled flue gas.

the combustion process is an air-fired fossil fuel combustion process, the fossil fuel is coal, and the $CO_2$-containing gas mixture comprising about 8% v/v to about 16% v/v $CO_2$.

the combustion process is an air-fired fossil fuel combustion process, the fossil fuel is natural gas, and the $CO_2$-containing gas mixture comprising about 3% v/v to about 10% v/v $CO_2$.

the $CO_2$-containing gas mixture comprising about 60% v/v to about 90% v/v $CO_2$.

the combustion process is a steam methane reforming (SMR) process, and the $CO_2$-containing gas mixture comprises about 15% v/v to about 90% v/v $CO_2$.

the combustion process is a blast furnace, and the $CO_2$-containing gas mixture comprises about 20% v/v to about 90% v/v $CO_2$.

the method further comprises the steps:
compressing the carbon dioxide-rich stream;
at least partially condensing the compressed carbon dioxide-rich stream by cooling to produce a $CO_2$ rich liquid and a $CO_2$ lean vapor stream;
expanding the $CO_2$ lean vapor stream; and
warming the expanded $CO_2$ lean vapor stream, the sweep gas being the warmed expanded $CO_2$ lean vapor stream.

the method further comprises the steps:
cooling the carbon dioxide-lean non-permeate;
expanding the cooled carbon dioxide-lean non-permeate; and
warming the expanded cooled carbon dioxide-lean non-permeate, the sweep gas being a portion of the warmed expanded cooled carbon dioxide-lean non-permeate.

the method further comprises the step of expanding the carbon dioxide lean stream to yield a pressure-reduced carbon dioxide lean stream having a temperature of from about −30° C. to about −60° C.

the method further comprises the step of warming the expanded carbon dioxide lean stream at a heat exchanger, the warmed expanded carbon dioxide lean stream being the sweep gas.

the method further comprises the steps of:
introducing the carbon dioxide lean stream to a combustion chamber of a gas turbine whereat a fuel and an oxidant are combusted;
directing the products of combustion from an outlet of the gas turbine to a heat exchanger; and
exchanging heat between the colder fuel, oxidant, and carbon dioxide lean stream upstream of the gas turbine with the warmer products of combustion at the heat exchanger.

the method further comprises the step of venting a portion of the cooled products of combustion to the atmosphere.

the method further comprises the steps of:
compressing the carbon dioxide-rich stream;
at least partially condensing the compressed carbon dioxide-rich permeate by cooling to produce a $CO_2$ rich liquid and a $CO_2$ lean vapor stream; and
cooling a portion of the cooled products of combustion with cold energy from the $CO_2$-rich liquid, the cooled portion of cooled products of combustion being the sweep gas.

the sweep gas has a $CO_2$ concentration lower than that of the gas mixture.

the method further comprises the steps of:
  compressing the carbon dioxide-rich stream;
  at least partially condensing the compressed carbon dioxide-rich permeate by cooling to produce a $CO_2$ rich liquid and a $CO_2$ lean vapor stream;
  cooling the carbon dioxide-lean non-permeate;
  expanding the cooled carbon dioxide-lean non-permeate at a cryogenic expander to produce solid carbon dioxide and a $CO_2$-depleted gas in a phase separator;
  warming the $CO_2$-depleted gas;
  expanding the warmed $CO_2$-depleted gas at a cold expander;
  warming the expanded warmed $CO_2$-depleted gas;
  heating the warmed expanded warmed $CO_2$-depleted gas via heat exchange with steam;
  expanding the heated warmed expanded warmed $CO_2$-depleted gas at hot expander to ambient or near-ambient pressure, a portion of which is used as the sweep gas.
the method further comprises the step of cooling the carbon dioxide-lean non-permeate at the heat exchanger before expansion thereof, wherein the cold energy provided to the heat exchanger is the cold carbon dioxide-lean stream.
the cold energy provided to the heat exchanger is the $CO_2$ lean vapor stream.
the $CO_2$ lean vapor stream is expanded before provision of its cold energy to the heat exchanger.
the cold energy provided to the heat exchanger is a portion of the $CO_2$ rich liquid.
the method further comprises the step of reducing pressures of two portions of $CO_2$ rich liquid to thereby provide two portions of cooled lower pressure $CO_2$ rich liquid, the cooled lower pressure $CO_2$ rich liquid providing the cold energy to the heat exchanger.
the method further comprises the step of compressing the $CO_2$-containing gas mixture to a pressure ranging from approximately 3 bar to approximately 60 bar prior to the cooling step.
the method further comprises the steps of:
  cooling the carbon dioxide-lean non-permeate at the heat exchanger;
  expanding the cooled carbon dioxide-lean non-permeate at a cryogenic expander to produce solid carbon dioxide and a $CO_2$-depleted gas in a phase separator;
  providing cold energy to the heat exchanger with the $CO_2$-depleted gas to produce warmed $CO_2$-depleted gas;
  expanding the warmed $CO_2$-depleted gas at a cold expander; and
  providing cold energy to the heat exchanger with the expanded warmed $CO_2$-depleted gas.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:
FIG. 2B is a table reporting data from a simulation of the process of FIG. 2A for a flue gas derived from air-fired coal combustion.
FIG. 9B is a table reporting data from a simulation of the process of FIG. 9A for a flue gas derived from air-fired coal combustion.

DESCRIPTION OF PREFERRED EMBODIMENTS

Figure 1:
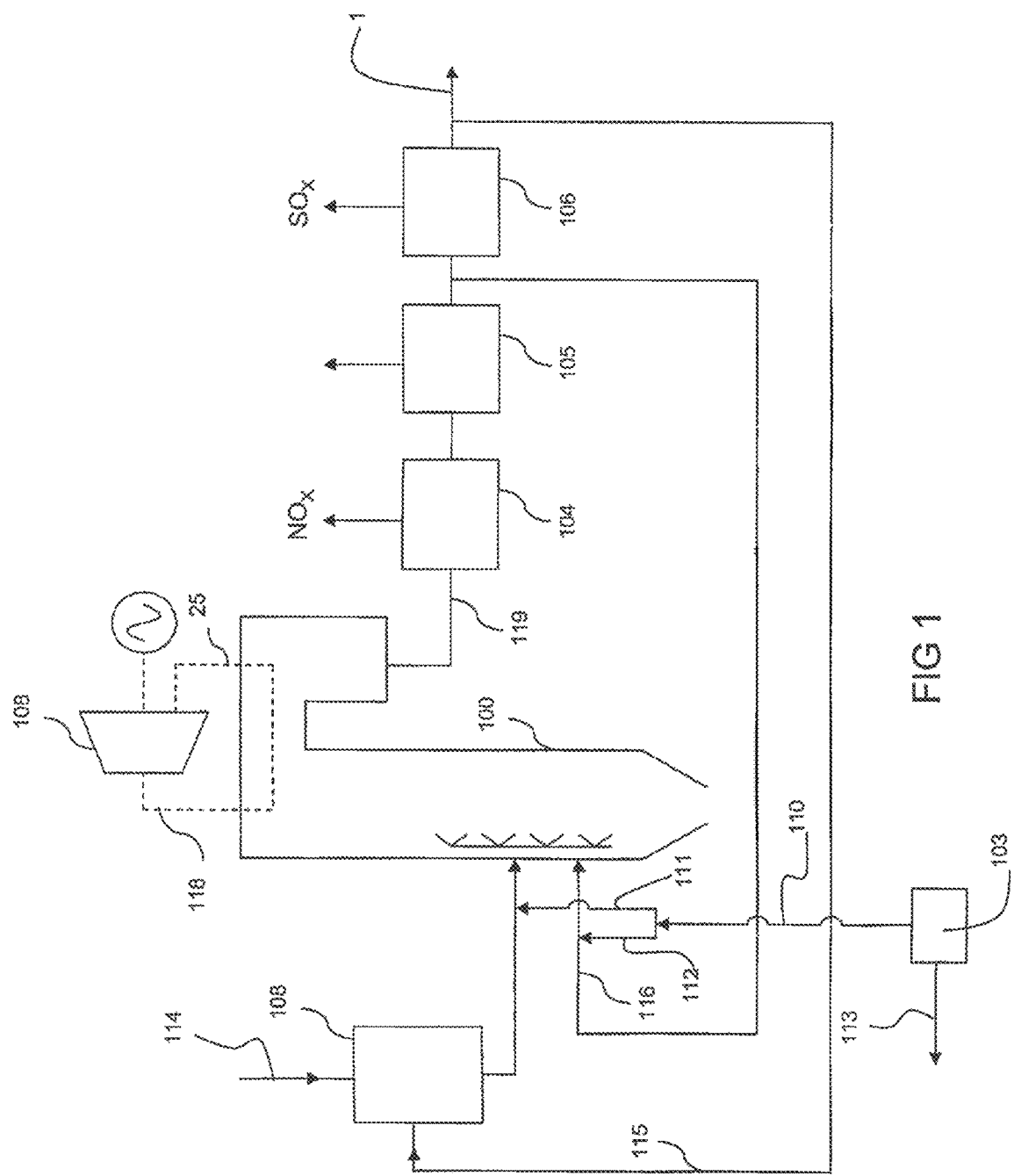
FIG. 1 is a schematic of an oxycoal combustion plant.

Disclosed is a method of obtaining carbon dioxide from a $CO_2$-containing gas mixture to provide purified $CO_2$. The method combines the benefits of gas membrane separation with those of cryogenic phase separation, but integrates the two to maximize efficiencies. For example, the disclosed method provides for the recovery of greater than approximately 90% of the $CO_2$ from the flue gas of an existing air-fired coal power plant with a less than approximately 35% increase in the plant's cost of electricity.

The $CO_2$-containing gas mixture may be obtained from the flue gas of a combustion process, from a natural gas stream, or from a $CO_2$ exhaust of an fermentative ethanol production plant. Suitable combustion processes include but are not limited to steam methane reforming (SMR), blast furnaces, and air-fired or oxygen-enhanced fossil fuel (including natural gas and coal) combustion processes such as power plants.

In the case of oxygen-enhanced fossil fuel combustion processes, the combustion may be full oxycombustion or partial oxycombustion. In full oxycombustion, the primary and secondary oxidants may be pure oxygen or synthetic air comprising oxygen and recycled flue gas. In partial oxycombustion, the primary oxidant may be air and the secondary oxidant may be synthetic air comprising oxygen and recycled flue gas. Pure oxygen means that the oxidant has a concentration typically found in conventional industrial oxygen production processes such as in cryogenic air separation units. The oxygen concentration of synthetic air may range from a concentration above that of oxygen in air to a concentration less than pure oxygen.

The $CO_2$-containing gas mixture may comprise between approximately 3% v/v and approximately 90% v/v $CO_2$. Preferably, the $CO_2$-containing gas mixture comprises between approximately 8% v/v and approximately 85% v/v $CO_2$. Other components that may be contained within the $CO_2$-containing gas mixture include but are not limited to other combustion byproducts, such as water, methane, nitrogen, oxygen, argon, carbon monoxide, oxides of sulfur, and oxides of nitrogen.

As one example, when the $CO_2$-containing gas mixture is the flue gas from an air-fired coal combustion plant, it typically will contain between approximately 8% v/v and approximately 16% v/v $CO_2$, with a balance of water, nitrogen, oxygen, argon, carbon monoxide, oxides of sulfur, and oxides of nitrogen. In another example, an air-fired natural gas combustion plant will typically produce a $CO_2$-containing gas mixture containing between approximately 3% v/v and approximately 10% v/v $CO_2$, with a balance of water, methane, nitrogen, oxygen, argon, carbon monoxide, oxides of sulfur, and oxides of nitrogen. In yet another example, when the $CO_2$-containing gas mixture is the flue gas from an oxycoal combustion plant (i.e., coal combusted with pure oxygen or synthetic air), it will contain between approximately 60% v/v to approximately 90% v/v $CO_2$, with a balance of water, nitrogen, oxygen, argon, carbon monoxide, oxides of sulfur, and oxides of nitrogen. In yet another example, when the $CO_2$-containing gas mixture is the flue gas from a steam methane reformer, it will contain between approximately 15% v/v and approximately 90% v/v $CO_2$, with a balance of water, methane, nitrogen, oxygen, argon, carbon monoxide, oxides of sulfur, and oxides of nitrogen. In yet another example, a blast furnace will produce a $CO_2$-containing gas mixture containing between approximately 20% and approximately 90% $CO_2$, with a balance of water, hydrogen, nitrogen, oxygen, argon, carbon monoxide, oxides of sulfur, and oxides of nitrogen.

FIG. 1 is a schematic view of an oxycoal combustion plant. Air separation unit 103 produces an oxygen stream 110 at a typical purity of 95-98 mol % and a waste nitrogen stream 113. Oxygen stream 110 is split into two sub streams 111 and 112. A primary flue gas recycle stream 115 passes through coal mills 108 where coal 114 is pulverized. Downstream of the coal mills 108, substream 111 is mixed with the combined pulverized coal/primary flue gas recycle stream and this mixture is introduced in the burners of the boiler 100. Substream 112 is mixed with secondary flue gas recycle stream 116 which provides the additional ballast to the burners to maintain temperatures within the furnace at acceptable levels. Boiler feedwater stream(s) 117 is introduced in the boiler 100 in order to produce steam stream(s) 118 which is expanded in steam turbine 108. As will be explained in further detail with reference to FIGS. 2 and 9-12, boiler feedwater stream(s) 117 may first be preheated in a compressor 20. Flue gas stream 119 rich in $CO_2$, typically containing more than 70 mol % on a dry basis, goes through several treatments to remove some impurities. Unit 104 is NOx removal system such as selective catalyst reduction. Unit 105 is a dust removal system such as electrostatic precipitator and/or baghouse filters. Unit 106 is a desulfurization system to remove $SO_2$ and/or $SO_3$. Units 104 and 106 may not be necessary depending on the $CO_2$ product specification. $CO_2$-containing gas mixture 1 is thus produced.

The $CO_2$-containing gas mixture may be treated to remove contaminants or impurities that would negatively affect the disclosed process. Suitable treatment methods include but are not limited to those disclosed in WO 2009010690, WO 2009095581, and U.S. Published Patent Application Nos. US 2009013717, US2009013868, and US2009013871, the treatment methods of which are incorporated herein by reference in their entireties. Furthermore, the moisture content of the $CO_2$-containing gas mixture should be reduced to a low level to avoid freezing in the cold heat exchanger used in the disclosed method. Known drying materials and adsorbent-based processes include alumina, silica, or molecular sieves. Condensation may also be used to lower the moisture content of the $CO_2$-containing gas mixture.

The minimum contaminant and impurity levels desired in membrane separation may differ from those desired in cryogenic phase separation. Therefore, one of ordinary skill in the art will recognize that the contaminants and impurities may be removed from the $CO_2$-containing gas mixture once prior to both separations, both prior to the membrane separation and prior to the cryogenic phase separation, or just prior to the cryogenic phase separation.

Depending upon its source, the $CO_2$-containing gas mixture may require compression by a compressor to a pressure ranging from approximately 3 bar to approximately 60 bar. Many treatment methods require compression and therefore may provide the $CO_2$-containing gas mixture at an appropriate pressure. Compression may be performed by one or more compressors. The compressor may be a centrifugal compressor, a screw compressor, a reciprocating compressor, an axial compressor, etc., and combinations thereof. In the fourth through sixth embodiment, compression may be provided by a modified gas turbine. One of ordinary skill in the art will recognize that compression will not be necessary for $CO_2$-containing gas mixtures obtained at elevated pressures.

When compression is necessary, the increase in gas pressure is accompanied by an increase in gas temperature. The temperature rise decreases compression efficiency and increases demands on the compressor. Typically, cooling may be performed between stages of compression or after the final stage of compression. Cooling may be performed by a direct or indirect heat exchanger. When using a heat exchanger, which may be integral to the compressor, the compressed $CO_2$-containing gas mixtures may be cooled indirectly by either a cooler gas or a liquid stream. For example, the heat of compression may be used to preheat water to be used in other processes, including as a boiler feed. In the case of a fossil fuel-fired power plant, it is particularly advantageous to preheat the boiler feed water prior to introduction to the power plant boiler. The cooling of the compressed $CO_2$-containing gas mixture and preheating of the boiler water improves compression efficiency and decreases the fuel input required by the boiler for steam generation. Both boiler and compression efficiency are increased. For example, when the $CO_2$-containing gas mixture is compressed to 16 bar, sufficient heat is generated to pre-heat boiler feed water to approximately 147° C. In a coal power plant, such pre-heating allows more steam turbine energy to be used for electricity generation.

In addition to any cooling that may be required after the optional compression step, the compressed $CO_2$-containing gas mixture may be cooled in one or more heat exchangers to a temperature ranging from approximately 5° C. to approximately −120° C., preferably from approximately −20° C. to approximately −50° C. One of ordinary skill in the art will recognize that some gas mixtures may freeze above −120° C. For example, certain mixtures of $N_2$ and $CO_2$ at 10 bar absolute will start freezing at close to approximately −70° C. Therefore, the temperature of the compressed $CO_2$-containing gas mixture should remain above its freezing point. Some condensation may result from this cooling step, which may be removed in a knock-out vessel. Indirect cooling may be performed by one or more heat exchangers. The heat exchanger may be a conventional heat exchanger, such as a plate fin, shell-in-tube, spiral wound, or brazed aluminum plate heat exchanger, or it may be a falling film evaporator as disclosed in EP 1008826, a heat exchanger derived from an automobile radiator as disclosed in pending US Pat. App. No. 2009/211733, or plate heat exchangers manufactured as disclosed in FR 2,930,464, FR 2,930,465, and FR 2,930,466. The heat exchangers in the cited applications are all incorporated herein by reference in their entireties. One type of brazed aluminum plate exchanger has multiple parallel cores allowing it to cool/heat any number of streams.

In one embodiment, the carbon dioxide-lean stream derived from a non-permeate in the membrane separation step may be used indirectly to cool the compressed $CO_2$-containing gas mixture. Additional indirect cooling may be provided by a $CO_2$-lean vapor stream derived from a cryogenic phase separation step (described in further detail below), a $CO_2$-rich liquid derived from a cryogenic phase separation step (described in further detail below), and/or a $CO_2$-depleted gas derived from a solid condensation step (described in further detail below). Optionally, the compressed $CO_2$-containing gas mixture may be directly cooled by combining it with the $CO_2$-lean vapor stream derived from the cryogenic phase separation step (described in further detail below). Surprisingly, and as will be explained in further detail below with respect to the first embodiment, the combined cold energies of the carbon dioxide-lean stream and the $CO_2$ lean vapor stream provide sufficient cooling for the compressed $CO_2$-containing gas mixture and for the carbon dioxide-rich stream from the membrane separation step, resulting in a cryogenic phase separation step that does not require external refrigeration. This embodiment eliminates the high operating cost of the cooling equipment cited as detrimental in the prior art and provides for greater than 90% $CO_2$ capture from existing pulverized coal-fired power plants with not more than a 35% increase in the cost of electricity. Alternatively, an external cooling source may be utilized to provide supplemental cooling to the heat exchanger.

One of ordinary skill in the art will recognize that, if multiple compressions steps are performed, each resulting compressed stream may subsequently be cooled in the same or different heat exchangers, resulting in multiple successive compression and cooling steps. Alternatively, the $CO_2$-containing gas stream may be subject to one compression step with multiple cooling steps or multiple compression steps with one cooling step.

The cooled and compressed $CO_2$-containing gas mixture flows into a gas separation membrane module to produce a permeate rich in carbon dioxide (from which carbon dioxide-rich stream is derived) and a non-permeate in carbon dioxide (from which a carbon dioxide-lean stream is derived). Depending upon a variety of factors, including the concentration of $CO_2$ in the cooled and compressed $CO_2$-containing gas mixture, the gas separation membrane module may utilize one or more gas separation modules. If more than one gas separation module is utilized, they may be arranged in series, parallel, cascade, or recycle formation. The gas separation membrane module may comprise flat sheet membranes, spiral wound flat sheet membranes, tubular tube membranes, hollow fiber membranes, and/or other membranes commonly used in industry or later developed.

When utilizing hollow fiber membranes, the cooled and compressed $CO_2$-containing gas mixture may be fed to the bore-side or shell-side of the membrane module in cross-flow or countercurrent flow. Bore side feed may have the advantage of the most-ideal counter-current behavior within the bundle, resulting in the best possible module performance. Shell side feed is more tolerant to higher particulate levels.

The mixture is fed to the non-permeate side of the gas separation membrane. The $CO_2$ is then separated from the gas mixture through selective permeation of $CO_2$ through the gas separation membrane to the permeate side thereof. One of ordinary skill in the art will recognize that the non-permeate "side" or the permeate "side" of a membrane do not necessarily mean a single side of a membrane. Rather, in the case of membranes that include a plurality of hollow fibers, the permeate "side" actually is considered to be the plurality of external surfaces of the individual hollow fibers (for bore-fed membranes) or the plurality of inner surfaces of the individual hollow fibers (for shell-fed membranes).

A sweep gas having low $CO_2$ concentration may be fed to the permeate side of the membrane where it acts to lower the partial pressure of $CO_2$ permeating through the membrane from the cooled and compressed $CO_2$-containing gas mixture. Under certain conditions, the use of the sweep gas results in a more energy efficient method and requires less membrane area. The concentration of $CO_2$ in the sweep gas should be less than the concentration of $CO_2$ in the $CO_2$ containing gas mixture and may even be approximately 0%. Suitable sweep gases include but are not limited to: dry air, dry nitrogen, dry oxygen, a portion of the carbon dioxide-lean stream derived from the carbon dioxide-lean non-permeate, a portion of the $CO_2$ depleted gas obtained from the solid condensation step (described in further detail below), and a portion of the $CO_2$ lean absorption phase from the third embodiment (recognizing that any residual solvent may need to be removed prior to its use as a sweep).

One of ordinary skill will recognize that the gas separation membrane produces a permeate stream richer in $CO_2$ than the feed gas stream and a non-permeate stream more dilute in $CO_2$ than the feed gas stream, but that it does not provide a 100% separation of $CO_2$ from the cooled and compressed $CO_2$-containing gas mixture (i.e. the feed gas stream). The percentage of $CO_2$ in each of the permeate and non-permeate streams will be determined based on a variety of factors, including but not limited to the concentration of $CO_2$ in the feed gas stream, the other components contained in the feed gas stream, the temperature and pressure of the feed gas stream, the selectivity of the gas separation membrane, etc. The concentration of $CO_2$ in the carbon dioxide-rich stream is selected to minimize the total process energy and/or costs. The concentration of $CO_2$ in the carbon dioxide-lean stream is determined by the recovery required for the process. For example, a carbon dioxide-lean stream containing between approximately 1% and approximately 2% $CO_2$ provides for an approximately 90% recovery of $CO_2$ from the $CO_2$-containing gas mixture obtained from air fired coal. One of ordinary skill in the art will recognize that the minimum amount of $CO_2$ recovery may be established by government mandates and that the optimal energy/cost scenarios may not correspond to these government mandates.

The gas separation membrane may be comprised of any material known in the field of gas separation that is selectively permeable to carbon dioxide over nitrogen, including but not limited to glassy or rubbery polymers. Typical rubbery polymers include silicone rubbers. Typical glass polymers are described below.

The gas separation membrane desirably has a permeability of oxygen in Barrers of less than $2000/(selectivity)^{3.5}$ for a gas mixture of 80 mole percent nitrogen and 20 mole percent oxygen at a temperature of 30° C. and at a pressure on one side of the membrane of 30 psia with a vacuum of less than 1 mm Hg on the other side of the membrane, wherein selectivity is oxygen to nitrogen selectivity. Typically, the selectivity under these conditions is in a range of from approximately 5 to approximately 9.

Alternatively or in addition to the above-recited oxygen permeability, suitable polymeric materials for the gas separation membrane have a $CO_2$ solubility at 35° C. and 10 bar pressure of >0.03 [$cm^3$(STP)/$cm^3$(polymer)-cmHg] and a glass transition temperature of >210° C. Exemplary glassy polymers satisfying these $CO_2$ solubility and glass transition temperature conditions include polyimides, fluoropolysulfones, poly(phenylene oxides), poly(fluorocarbonates), and condensation polymers of 2,2,2-trifluoroacetophenone and either biphenyl or terphenyl ether.

The polyimides may be a polymer or copolymer having repeating units of formula (I):

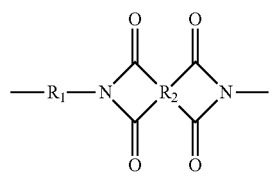

(I)

wherein:
each $R_2$ is a moiety independently selected from the group of consisting of formula (A), formula (B), formula (C) formula (D) and mixtures thereof,

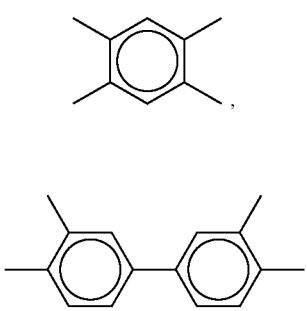

(A)

(B)

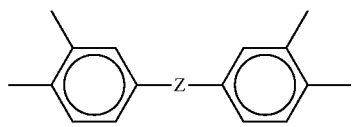

(C)

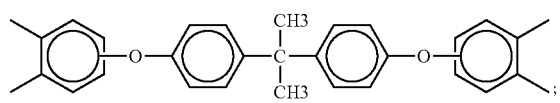

(D)

each Z is a moiety independently selected from the group consisting of formula (L), formula (M), formula (N) and/or a mixture thereof

(L)

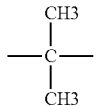

(M)

(N)

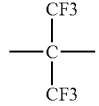

(O)

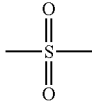

(P)

each $R_1$ is a moiety independently selected from the group consisting of a molecular segment of formula (a), formula (b), formula (c), formula (d), formula (e), formula (f), formula (g), and mixtures thereof

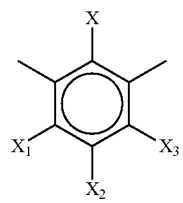

(a)

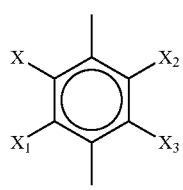

(b)

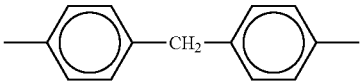

(c)

(d)

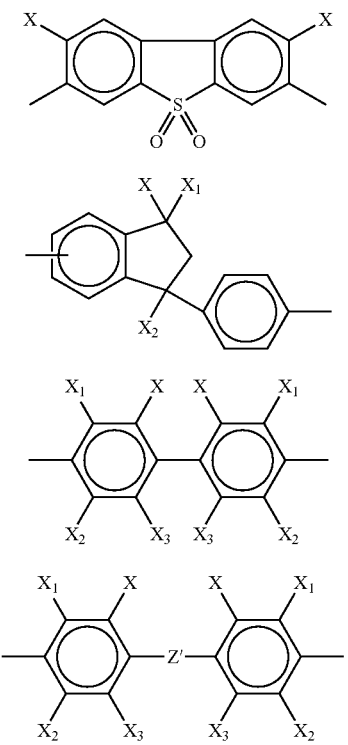

each Z' is a molecular segment independently selected from the group consisting of formula (h), formula (j), formula (k), formula (I), and mixtures thereof

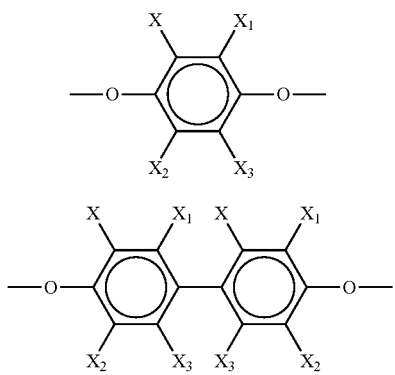

(k)

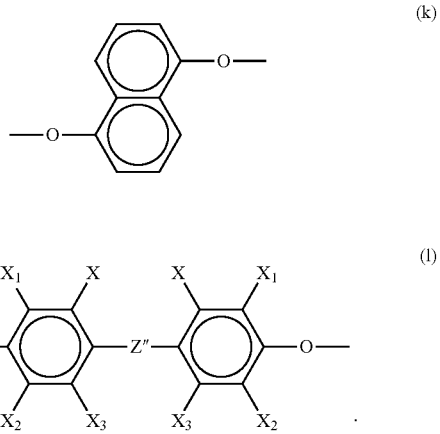

each X, $X_1$, $X_2$, and $X_3$ is independently selected from the group consisting of hydrogen and an alkyl group having 1 to 6 carbon atoms;

each Z" is a moiety independently selected from the group consisting of formula (m) and formula (p)

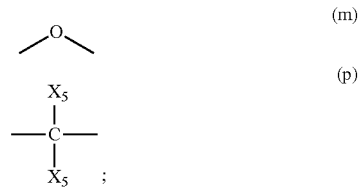

and each $X_5$ is independently selected from the group consisting of hydrogen, an alkyl group having 1 to 6 carbon atoms, and a pefluoroalkyl group having 1 to 6 carbon atoms.

Suitable polyimides include the polyimides synthesized by conventional techniques from the combinations of diamines/diisocyanates and dianhydrides shown in Table I where the listed formulae (a), (c), (e), and (g) of the diamine/diisocyanates and the formulae (C) and (D) of the dianhydrides correspond to the formulae (a), (c), (e), (g), (C), and (D) above in formulae (I).

TABLE 1

Diamines/Diisocyanates and Dianhydrides for polymerizing polyimides

| Diamine / Diisocyanate | Dianhydride | $O_2$ permeability (Barrer) of polyimide | $O_2/N_2$ selectivity of polyimide |
|---|---|---|---|
| 3,4' oxy dianiline (formula g) | BPADA (formula D) | 0.45 | 7.23 |

TABLE 1-continued

Diamines/Diisocyanates and Dianhydrides for polymerizing polyimides

| Diamine / Diisocyanate | Dianhydride | $O_2$ permeability (Barrer) of polyimide | $O_2/N_2$ selectivity of polyimide |
|---|---|---|---|
| Diamino phenylindane (formula e) | BPADA (formula (D)) | 2.25 | 6.5 |
| m-phenylene diamine (formula (a)) + Diamino phenylindane (formula e) in a 1:1 ratio | 3,3',4,4'-diphenylsulfone-tetracarboxylic dianhydride (DSDA) (formula C) | 0.60 | 6.78 |
| m-phenylene diamine (formula (a)) + Diamino phenylindane (formula e) in a 1:1 ratio | BPADA (formula (D)) | 1.44 | 7.78 |
| 1,3-diaminobenzene-4-sulfonic acid (HSMPD) (formula a) | 3,3',4,4'-diphenylsulfone-tetracarboxylic dianhydride (DSDA) (formula C) | 0.35 | 8.1 |
| m-phenylene diamine (formula (a)) | BPADA (formula (D)) | 0.4 | 8.0 |
| Diamino phenylindane (formula e) | 3,3',4,4'-Benzophenone tetracarboxylic dianhydride (formula C) | 1.30 | 7.1 |
| methylphenylene-diisocyanate (TDI) (formula a) + 20% diphenylmethane diisocyanate (MDI) (formula c) | 3,3',4,4'-Benzophenone tetracarboxylic dianhydride (formula C) | 0.4 | 7.8 |

One particular polyimide is sold by Sabic Innovative Plastics IP B.V. Company under the trademark Ultem® (hereinafter the Ultem® polyimide) in which $R_1$ is of formula (a), X, $X_1$, $X_2$, and $X_3$ are hydrogen and $R_2$ is of formula (D). Ultem has a $CO_2$ solubility at 35° C. and 10 bar pressure of 0.07904 [$cm^3$(STP)/$cm^3$(polymer)-cmHg] and a glass transition temperature of 215° C.

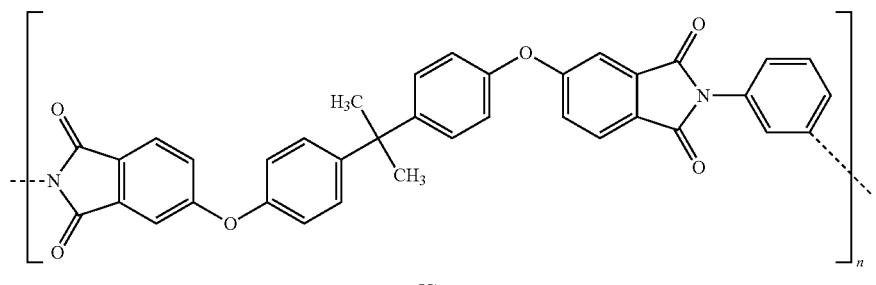

Ultem

Another particular polyimide is sold under the trademark Matrimid® (hereinafter the Matrimid® polyimide) in which $R_1$ is of formula (e), X, $X_1$, and $X_2$ are methyl groups, $R_2$ is of formula (C), and Z is of formula (L). Matrimid has a $CO_2$ solubility at 35° C. and 10 bar pressure of 0.056 [$cm^3$(STP)/$cm^3$(polymer)-cmHg] and a glass transition temperature of 315° C.

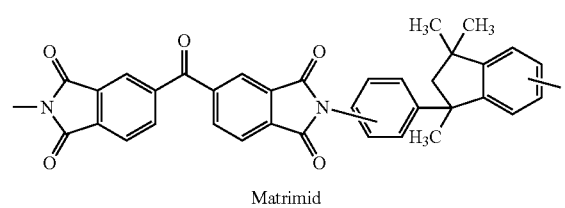

Matrimid

Another particular polymide is sold by Evonik Fibres GmbH under the trademark P84® (hereinafter the P84® polyimide) in which $R_1$ is of formula (a) in 80% of the $R_1$'s and of formula (c) in 20% of the $R_1$'s, $R_2$ is of formula (C), and Z is of formula (L). P84 has a $CO_2$ solubility at 35° C. and 10 bar pressure of >0.07 [cm³(STP)/cm³(polymer)-cmHg] and a glass transition temperature of 316° C.

Another suitable polymide is 6FDA-IPDA which may be sythesized from hexafluorobisphenol dianhydride and isophorone diamine. 6FDA-IPDA has a $CO_2$ solubility at 35° C. and 10 bar pressure of 0.0558 [cm³(STP)/cm³(polymer)-cmHg] and a glass transition temperature of 310° C.

Suitable polyfluorosulfones include polymers having repeating units of formula (II)

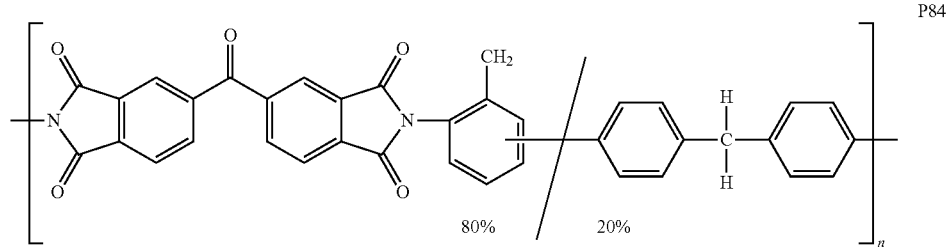

Another suitable polymide is BPDA-ppODA which may be sythesized from 3,3',4,4'-Biphenyltetracarboxylic dianhydride and 4,4'oxydianiline. BPDA-ppODA has a $CO_2$ solubility at 35° C. and 10 bar pressure of 0.036 [cm³(STP)/cm³(polymer)-cmHg] and a glass transition temperature of 270° C.

Another suitable polymide is BTDA-ppODA which may be sythesized from 3,3',4,4'-Benzophenone tetracarboxylic dianhydride and 4,4'oxydianiline. BTDA-ppODA has a $CO_2$ solubility at 35° C. and 10 bar pressure of 0.032 [cm³(STP)/cm³(polymer)-cmHg] and a glass transition temperature of 266° C.

Another suitable polymide is PMDA-MDA which may be sythesized from pyromellitic dianhydride and methylene dianiline. PMDA-MDA has a $CO_2$ solubility at 35° C. and 10 bar pressure of 0.0447 [cm³(STP)/cm³(polymer)-cmHg] and a glass transition temperature of 338° C.

Another suitable polymide is Kapton which may be sythesized from pyromellitic dianhydride and 4,4'-oxydianiline. Kapton has a $CO_2$ solubility at 35° C. and 10 bar pressure of 0.030977 [cm³(STP)/cm³(polymer)-cmHg] and a glass transition temperature of 400° C.

Another suitable polymide is 6FDA/BPDA+DAM which may be sythesized from hexafluorobisphenol dianhydride/3,3',4,4'-Biphenyltetracarboxylic dianhydride and diamino mesitylene.

Another suitable polymide is 6FDA-mpODA which may be sythesized from hexafluorobisphenol dianhydride and 3,4'oxydianiline. 6FDA-mpODA has a $CO_2$ solubility at 35° C. and 10 bar pressure of 0.046 [cm³(STP)/cm³(polymer)-cmHg] and a glass transition temperature of 260° C.

Another suitable polymide is 6FDA-ppODA which may be sythesized from hexafluorobisphenol dianhydride and 4,4'oxydianiline. 6FDA-ppODA has a $CO_2$ solubility at 35° C. and 10 bar pressure of 0.054 [cm³(STP)/cm³(polymer)-cmHg] and a glass transition temperature of 299° C.

Another suitable polymide is 6FDA-PDA which may be sythesized from hexafluorobisphenol dianhydride and phenylene diamine. 6FDA-PDA has a $CO_2$ solubility at 35° C. and 10 bar pressure of 0.0521 [cm³(STP)/cm³(polymer)-cmHg] and a glass transition temperature of 304° C.

$$[R_3]_q \quad [R_4]_s \tag{II}$$

wherein:

q=s;

each $R_3$ is a moiety independently selected from the group consisting of a molecular segment of formula t, formula u, and formula v.

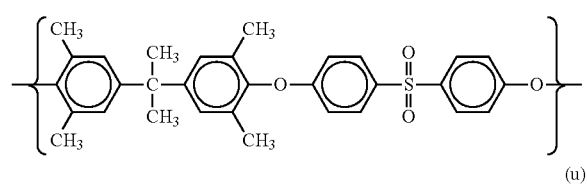

(t)

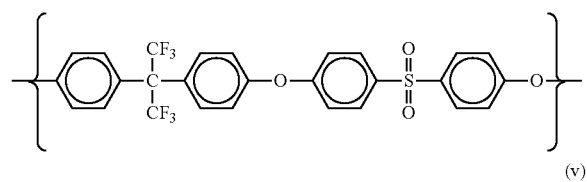

(u)

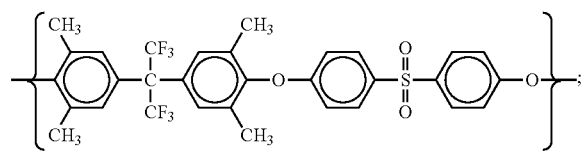

(v)

and R4 consists of a molecular segment of formula (w):

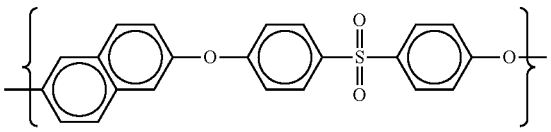

(w)

A polysulfone having an $R_3$ of formula (t) is known as TM-NPSF and is polymerized from 2,6-dihydroxynaphthalene, tetramethyl bisphenol-A, and bis(4-fluorophenyl)sulfone. A polysulfone having an $R_3$ of formula (u) is known as HF-NPSF and is polymerized from 2,6-dihydroxynaphthalene, hexafluoro bisphenol, and bis(4-fluorophenyl)sulfone. A polysulfone having an $R_3$ of formula (v) is known as TMHF-NPSF and is polymerized from 2,6-dihydroxynaphthalene, tetramethyl hexafluorobisphenol, and bis(4-fluorophenyl)sulfone. Those skilled in the art will well recognize how TM-NPSF, HF-NPSF, and TMHF-NPSF are polymerized. Particularly suitable syntheses are disclosed by C. Camacho-Zuniga, F. A. Ruiz-Trevino, S. Hernández-López, M. G. Zolotukhin, F. H. J. Maurer, A. González-Montiel, "Aromatic polysulfone copolymers for gas separation membrane applications", *Journal of Membrane Science*, 340 (2009) 221-226.

Suitable poly(phenylene oxides) include polyphenylene oxide (PPO) of formula (III), $NO_2$-substituted (nitrated) PPO, and $NH_2$-substituted (aminated) PPO.

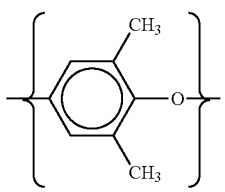

(III)

Those skilled in the art will recognize that the preparation of $NO_2$-substituted (nitrated) PPO is known in the art and may be performed as follows. Y. S. Bhole, P. B. Karadkar, U. K. Kharul, "Nitration and amination of polyphenylene oxide: Synthesis, gas sorption and permeation analysis", *European Polymer Journal* 43 (2007) 1450-1459. PPO is dissolved in a suitable solvent such as chloroform at ambient temperature under a flow of $N_2$. A mixture of nitric acid and sulfuric acid is slowly added while maintaining the dissolved PPO at a temperature of 25° C. Those skilled in the art will recognize that the degree of substitution may be increased by increasing the ratio of nitric acid to sulfuric acid in the mixture. Following addition, the reaction mixture is stirred for 30 minutes. The formed nitrated PPO is then precipitated onto stirred methanol and further purified by dissolution in chloroform and reprecipitation into methanol.

Those skilled in the art will recognize that the preparation of $NH_2$-substituted (aminated) PPO is known in the art and may be performed as follows. Y. S. Bhole, et al. $NO_2$-substituted PPO is dissolved in a suitable solvent such as chloroform in a two-necked RB flask equipped with a reflux condenser. A solution of 30 g of $SnCl_2.2H_2O$ and 1 g of NaI in 72 ml HCl-glacial acetic acid mixture (2:1) is added in a drop wise manner at 60° C. while stirring. After 15 minutes of addition of the reducing mixture, the polymer starts precipitating. To avoid precipitation, a small quantity of methanol is added until the solution becomes clear. The resulting mixture is further refluxed for 3 hours and then cooled to room temperature. The resultant polymer is precipitated by pouring the reaction mixture onto a 2 N NaOH solution. The precipitated polymer is then water-washed until free of base. It is then air dried for 2 days at room temperature under vacuum. The dried polymer is purified by dissolving in chloroform and precipitating in methanol.

Suitable poly(fluorocarbonates) include but are not limited to poly(tetrachlorohexafluorocarbonate) and poly(tetrabromohexafluorocarbonate).

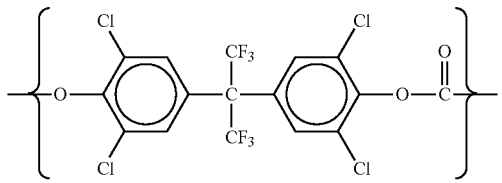

poly (tetrachlorohexafluorocarbonate)

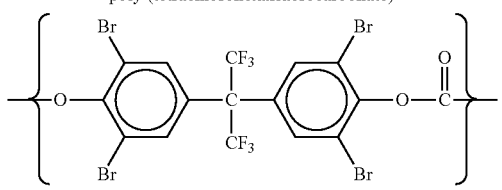

poly (tetrabromohexafluorocarbonate)

Those skilled in the art will recognize that the condensation polymers of 2,2,2-trifluoroacetophenone with biphenyl, terphenyl or both biphenyl and terphenyl ethers are known in the art as TFP BPE, TFP TPE, and TFP BPE/TPE, respectively, and may be synthesized as follows. M. T. Guzmán-Gutiérrez, M. G. Zolotukhin, D. Fritsch, F. A. Ruiz-Trevino, G. Cedillo, E. Fregoso-Israel, C. Ortiz-Estrada, J. Chavez, C. Kudla, "Synthesis and gas transport properties of new aromatic 3F polymers", *Journal of Membrane Science* 323 (2008) 379-385. In a typical synthesis, equimolar amounts of trifluoroacetophenone and either biphenyl, terphenyl or a mixture of biphenyl and terphenyl are dissolved in dichloromethane. Trifluoromethanesulfonic acid is added and the mixture stirred at room temperature for 72 hours. The resulting green, two-phase, system is then poured slowly into methanol. The precipitated, pale white solid is filtered off, extracted with refluxing methanol and acetone, and then dried at 100° C. under vacuum.

The above polymers (polyimides, fluoropolysulfones, poly(phenylene oxides) and condensation polymers of 2,2, 2-trifluoroacetophenone and either biphenyl or terphenyl ether) may be expected to exhibit enhanced properties at relatively low temperatures. When a gas separation membrane made of one of the above polymers is fed with a $CO_2$-containing feed gas at temperatures less than approximately −10° C., the $CO_2$ permeance is approximately two times higher than the value that would be predicted by a simple Arrhenius extrapolation of super-ambient (20°-50° C.) temperature data. The $CO_2/N_2$ selectivity continues to increase as temperature decreases.

Unexpectedly, and as shown in the examples that follow, a gas separation membrane utilizing certain of the above-described polymers exhibit an increase in flux without the expected decrease in selectivity during the passage of time. Other of the above-described polymers are expected to exhibit the same unexpected advantage. As a result, the $CO_2$ permeance at −40° C. is similar or even higher than the permeance at ambient temperature. In addition, the $CO_2/N_2$ or $CO_2/O_2$ selectivity at the colder temperature is approximately two to approximately four times higher than at the ambient temperature value. Preferably, over time, the membranes exhibit an increase in flux with a parallel increase or slight decrease in selectivity, the decrease ranging from approximately 0% to approximately 5%. The exact mechanism by which the $CO_2$ permeance increases without loss of selectivity remains unknown.

Gas separation membranes made of the above-described polymeric materials show stable or even increased $CO_2$ selectivity in these long-term tests even as the $CO_2$ permeance increases. This is a critical difference between the low temperature conditioning phenomena observed here and the better known plasticization phenomena that is often a problem in $CO_2$ separation by membranes. At low temperatures and moderate feed pressures, $CO_2$ activity (~$CO_2$ partial pressure/saturation pressure) is high (up to 0.65). Plasticization, which is typically attributed to increased mobility of the polymer matrix caused by the high $CO_2$ activity, results in increased $CO_2$ permeance, and with conventional polymeric materials, reduced selectivity with air gases. In contrast, the selectivity of gas separation membranes made of the above-described polymeric materials, and at the low temperature and high $CO_2$ activity operation proposed herein, does not decrease even when $CO_2$ permeance increases markedly. The net effect of cold temperature operation is as if a new material had been discovered with unprecedented permeability-selectivity characteristics on the Robeson trade-off plot After the permeation process, the carbon dioxide-rich stream is compressed by a compressor to a pressure ranging from approximately 15 bar to approximately 30 bar. Compression may be performed by one or more compressors. The compressor may be a centrifugal compressor, a screw compressor, a reciprocating compressor, an axial compressor, etc., and combinations thereof. The compressed carbon dioxide-rich stream is then cooled to a temperature that yields a liquid vapor mixture. One of ordinary skill in the art will recognize that the specific temperature that yields the liquid vapor mixture will depend upon multiple factors, including the concentration of $CO_2$ in the compressed carbon dioxide-rich stream, the pressure of the compressed carbon dioxide-rich stream, etc. The cooling may be performed by direct or indirect heat exchange with other fluids in the process (described in further detail below).

In one particularly preferred embodiment, the carbon dioxide-lean stream from the membrane separation step (before and/or after expansion thereof) may be used to cool the compressed carbon dioxide-rich stream via a heat exchanger. Additional cooling may be provided by $CO_2$ lean vapor stream from a cryogenic phase separation step. Surprisingly, and as will be explained in further detail below with respect to the first embodiment, the combined cold energies of the carbon dioxide-lean stream (before and/or after expansion thereof) and the $CO_2$ lean vapor stream provide sufficient cooling for the compressed $CO_2$-containing gas mixture and the compressed carbon dioxide-rich stream such that the compressed carbon dioxide-rich stream may be subjected to cryogenic phase separation without requiring external refrigeration. This embodiment eliminates the high operating cost of the cooling equipment cited as detrimental in the prior art and provides for greater than 90% $CO_2$ capture from existing pulverized coal-fired power plants with not more than a 35% increase in the cost of electricity. Alternatively or in addition to cooling by either of the carbon dioxide-lean stream and the $CO_2$ lean vapor stream, the $CO_2$ rich liquid from the cryogenic phase separation step may also be used to provide cooling to the compressed carbon dioxide-rich stream via the heat exchanger. If desired, in another alternate embodiment an external cooling source may be utilized to provide cooling to the heat exchanger.

One of ordinary skill in the art will recognize that, if multiple compressions steps are performed, each resulting compressed stream may subsequently be cooled, resulting in multiple successive compression and cooling steps. Alternatively, the carbon dioxide-rich stream may be subject to one compression step with multiple cooling steps or multiple compression steps with one cooling step.

The compressed carbon dioxide-rich stream may be cooled to a temperature lower than that of the $CO_2$-containing gas mixture fed to the membrane. Smaller amounts of contaminants and impurities may negatively affect processing of the carbon dioxide-rich stream at such temperatures. As such, the compressed carbon dioxide-rich stream may require a greater reduction of contaminants or impurities than was required for the $CO_2$-containing gas mixture. As the compressed carbon dioxide-rich stream is smaller than the $CO_2$-containing gas mixture, it may be beneficial to perform two contaminant removal steps. The first contaminant removal step treats the $CO_2$-containing gas mixture to remove contaminants to the level required for the cold membrane operation. The second contaminant removal step subsequently treats the compressed carbon dioxide-rich stream to remove contaminants to the level required for processing the carbon dioxide-rich stream.

The compressed and cooled carbon dioxide-rich stream is then subjected to cryogenic phase separation to produce a $CO_2$ rich liquid and a $CO_2$ lean vapor stream. Cryogenic phase separation is performed at a temperature typically ranging from approximately $-30°$ C. to approximately $-150°$ C., and preferably at a temperature ranging from approximately $-45°$ C. to approximately $-120°$ C. The cryogenic phase separation may be a liquid separator. If it is desirable to remove incondensible components in the $CO_2$-rich liquid (such as $N_2$, Ar and/or $O_2$ dissolved in the $CO_2$-rich liquid) and thereby produce higher $CO_2$ purities, the $CO_2$-rich liquid may be further subjected to cryogenic distillation performed in a distillation or fractionation column or zone. In this latter case of cryogenic distillation, through heat exchange with other fluids—such as the non-permeate (before and/or after expansion), the $CO_2$-lean vapor stream from the cryogenic phase separator, and/or the $CO_2$-rich liquid from the cryogenic phase separator—in the process, the compressed and cooled carbon dioxide-rich stream receives all of the cooling needed for the cryogenic phase separation. No other cooling of the cryogenic phase separator is needed, although external heating conventional to distillation columns may be provided. The cryogenic phase separation step divides a $CO_2$-lean vapor fraction from a $CO_2$-rich liquid fraction of the compressed and cooled carbon dioxide-rich stream to provide the $CO_2$-lean vapor stream and the $CO_2$-rich liquid.

After separation, the $CO_2$-rich liquid is pumped to a pressure so that, if it is warmed to room temperature, it remains a liquid. Preferably, the $CO_2$-rich liquid is pumped to a pressure ranging from approximately 40 bar to approximately 80 bar, more preferably to approximately 60 bar. The $CO_2$ rich liquid passes through the heat exchanger and is provided at approximately 60 bar and approximately 20° C. In one embodiment, one or more portions of the $CO_2$-rich liquid are pumped to one or more pressure-reduction valves where the pressure of the $CO_2$-rich liquid is reduced to a desired level. In the event that a distillation or fractional column or zone is utilized in conjunction with the cryogenic phase separator, the especially $CO_2$-lean vapor from the top of the column or zone may be used as yet another source of cooling for the one or more heat exchangers. As described in further detail below, the resultant optional reduced pressure $CO_2$-rich liquid streams may be utilized in solid condensation of $CO_2$ vapor and/or liquefaction of solid $CO_2$.

The temperature of the $CO_2$ lean vapor stream remains low. Therefore, as discussed previously, the $CO_2$ lean vapor stream may be utilized as a cooling source (before and/or after expansion) in one or more heat exchangers. Furthermore, the carbon dioxide content of the $CO_2$ lean vapor stream may be approximately 10% v/v to approximately 50% v/v and its pressure remains between approximately 15 bar to approximately 30 bar. To reduce the pressure, the $CO_2$ lean vapor stream may be warmed, expanded, and then combined with the $CO_2$-containing gas mixture for additional processing and recovery.

After the permeation process, the temperature of the carbon dioxide-lean non-permeate stream remains low and may possibly be lower than that of the cooled and compressed $CO_2$-containing gas mixture. For example, the temperature of the carbon dioxide-lean non-permate stream may range from approximately 1° C. to approximately 20° C. cooler than that of the cooled and compressed $CO_2$-containing gas mixture. As a result, and as discussed previously, the carbon dioxide-lean non-permeate stream may optionally be used to provide a cooling source for other fluids in the process—such as the cooled and compressed $CO_2$-containing gas mixture—via one or more heat exchangers.

The carbon dioxide-lean non-permeate stream remains at high pressure after the permeation process and may be subjected to expansion in one or multiple stages to cover cold energy and/or to produce the mechanical energy required to compress the $CO_2$-containing gas mixture. The single or multiple expansions may be performed on the carbon dioxide-lean non-permeate stream by one or more pressure reduction devices. Whether or not the carbon dioxide-lean non-permeate stream passes through the optional heat exchanger(s), the carbon dioxide-lean non-permeate stream reaches the pressure reduction device at a temperature ranging from about 0° C. to about −55° C. and at a pressure ranging from about 1.5 bar to about 30 bar. When utilizing multiple pressure reduction devices, the carbon dioxide-lean non-permeate stream may be subjected to a stepwise reduction in pressure, producing multiple expanded carbon dioxide-lean streams. The expansion may be performed by any pressure reduction device including but not limited to conventional turbo-expanders, Joule-Thomson valves, reciprocating expansion engines, centrifugal or axial flow turbines, etc., and any combinations thereof. The pressure reduction device may be a turbo-expander used to harness mechanical energy from the expansion and provide power to other components, such as the compressor for compressing the $CO_2$-containing gas mixture or the $CO_2$-rich permeate stream. One of ordinary skill in the art will be capable of optimizing the number of pressure reduction devices for the desired thermodynamic outcome.

Liquid $CO_2$

In a first embodiment, the gas separation membrane produces a carbon dioxide-rich permeate stream containing approximately 50% v/v to approximately 95% v/v carbon dioxide. The carbon dioxide-lean non-permeate stream may then be expanded to a pressure providing a temperature suitable to provide sufficient cold energy for partial liquid condensation of carbon dioxide in the carbon dioxide-rich stream. Typically, such expanded $CO_2$-lean non-permeate temperatures range from approximately −30° C. to approximately −70° C. Preferably, the carbon dioxide-lean non-permeate stream leaves the expander at a temperature ranging from about −50° C. to about −57° C. and at a pressure ranging from less than about 30 bar to about atmospheric pressure. The thus-produced one or more cold carbon dioxide-lean streams flow into one or more heat exchangers to provide indirect cooling to the $CO_2$-containing gas mixture and/or the compressed carbon dioxide-rich stream. As in the compression and cooling of the $CO_2$-containing gas stream, one of ordinary skill in the art will recognize that, if multiple pressure reduction steps are performed, each resulting stream may subsequently provide cooling to and be warmed in one or more heat exchangers, resulting in multiple successive expansion and warming steps. Alternatively, the cold carbon dioxide-lean stream may be subject to one expansion step with multiple warming steps or multiple expansion steps with one warming step.

As discussed previously, the combination of the $CO_2$ lean vapor stream and the carbon dioxide-lean stream, and more particularly the expansion of the carbon dioxide-lean stream, provides sufficient cooling for the compressed $CO_2$-containing gas mixture and the compressed carbon dioxide-rich stream, resulting in a cryogenic phase separation step that does not require external refrigeration. This embodiment eliminates the high operating cost of the cooling equipment cited as detrimental in the prior art and provides for greater than 90% $CO_2$ capture from existing pulverized coal-fired power plants with not more than a 35% increase in the cost of electricity.

Solid $CO_2$

In a second embodiment, the gas separation membrane produces a carbon dioxide-rich stream containing approximately 50% v/v to approximately 95% v/v carbon dioxide and/or a carbon dioxide-lean stream containing approximately 4% v/v to approximately 15% v/v carbon dioxide. As in the first embodiment, the carbon dioxide-rich stream is compressed and cooled to produce a liquid vapor mixture that is subsequently separated to produce the $CO_2$ rich liquid. In this embodiment, the carbon dioxide-lean stream may be expanded to a temperature suitable for solid condensation (also called desublimation or anti-sublimation) of the carbon dioxide in the carbon dioxide-lean stream.

The carbon dioxide-lean stream may be fed to a cryogenic turbo expander similar to those used in air separation units (i.e. a radial wheel). The pressure of the carbon dioxide-lean stream is reduced to atmospheric pressure in a single stage, while its temperature is dropped to a range from approximately −90° C. to approximately −120° C. During the expansion, $CO_2$ snow will be formed, leaving behind a $CO_2$ depleted gas containing approximately 0.5% v/v to approximately 5% v/v $CO_2$. The outlet of the cryogenic turbo expander includes a gas/solid separator. The $CO_2$ snow will be extracted from the separator by an auger screw, which may serve to elevate the pressure of the $CO_2$ snow to its triple point (5.2 bar abs). The latent heat of liquefaction may be used to cool the flue gas or to condense the carbon dioxide-rich stream after compression, or a warmed, vaporized portion of $CO_2$-rich liquid may be used to directly heat the solid carbon dioxide to liquefy it. The thus-liquefied carbon dioxide may be mixed with the $CO_2$-rich liquid. Alternatively, the $CO_2$ snow may also be directly injected into the $CO_2$ rich liquid.

The carbon dioxide-lean stream may instead be fed to a heat exchanger optionally provided with a mechanical scraper. In such an embodiment, the carbon dioxide-lean stream is cooled to an exent that the gas phase carbon dioxide is condensed into the solid phase. The mechanical scraper scrapes the solid carbon dioxide formed on the surface of the heat exchanger and feeds it to an auger screw which may serve to elevate the pressure of the solid carbon dioxide to its triple point (5.2 bar abs). The latent heat of liquefaction may be used to cool the flue gas or to condense the carbon dioxide-rich stream after compression or a warmed, vaporized portion of the $CO_2$-rich liquid may be used to directly heat the solid carbon dioxide to liquefy it. This solid condensation and subsequent liquefaction may be performed in parallel with solid condensation occurring at one heat exchanger while the solid carbon dioxide in the other heat exchanger is simultaneously liquefied. The thus-liquefied $CO_2$ may be mixed with the $CO_2$-rich liquid. Alternatively, the $CO_2$ snow may also be directly injected into the $CO_2$ rich liquid.

One of ordinary skill in the art will recognize that the $CO_2$ snow may contain components other than $CO_2$. Other gaseous components may be solidified in the turbo expander or incorporated into the $CO_2$ snow as bubbles or drops. Therefore, the $CO_2$ snow may not be entirely constituted of $CO_2$.

Cold Absorption

In a third embodiment, the gas separation membrane produces a carbon dioxide-lean stream containing approximately 2 mole % to approximately 10 mole % carbon dioxide. As in the first and second embodiments, the carbon dioxide-rich stream is compressed and cooled to produce a liquid vapor mixture that is subsequently separated to produce the $CO_2$ rich liquid. The $CO_2$ concentration in the carbon dioxide-lean stream may be decreased further by an absorption process which is also operated at sub-ambient temperature. Examples of a suitable sub-ambient absorption processes are those based on methanol or chilled ammonia as described in U.S. Published Patent Application No. 2009/148930, WO06/022885, and WO09/073,422, the absorption processes of which are hereby incorporated herein by reference.

The carbon dioxide-lean stream may be sent directly to the chilled absorption process before or after expansion. Preferably, the carbon dioxide-lean stream is sent to the chilled absorption process before expansion. The chilled absorption process is highly effective at reducing $CO_2$ to low percentage levels, typically ranging from approximately 0.5% v/v to approximately 2% v/v. The $CO_2$ absorption process may be optimized through the pressure and temperature of the carbon dioxide-lean stream. Typical pressures for the $CO_2$ absorption step with chilled ammonia may range from approximately 1 to approximately 5 bar and temperatures may range from approximately 0° C. to approximately 15° C. Cold temperature operation also minimizes absorption solvent (e.g., methanol, ammonia) loss in the vent gas. Due to the lower $CO_2$ content in the carbon dioxide-lean stream, the energy costs for regenerating the absorption solvent are lower when compared to the energy costs to regenerate the absorption solvent for the $CO_2$-containing gas mixture. The cold membrane process is more efficient at $CO_2$ recovery at relatively higher $CO_2$ concentrations. The hybrid cold membrane and cold absorption configuration for $CO_2$ capture may be more economical than either process alone.

Gas Turbine Embodiments

The fourth through sixth embodiments incorporate a modified gas turbine comprising a compressor, combustion chamber, and turbine. Suitable gas turbines for modification are available from GE, Siemens, Mitsubishi, or Alstom. In these embodiments, the compressor of the gas turbine is used to compress the $CO_2$-containing gas mixture. The gas turbine is modified so that the $CO_2$-containing gas mixture may be extracted from the compressor after compression, rather than being directed to the combustion chamber, and further modified so that the carbon dioxide-lean stream may be introduced to the combustion chamber. Expansion of the carbon dioxide-lean stream or expansion of the products of combustion from the combustion chamber (combusted in the presence of the carbon dioxide-lean stream) in the turbine provides mechanical energy to power the compressor.

The compressed $CO_2$-containing gas mixture is extracted from the gas turbine, cooled, and directed to the gas separation membrane module to produce a carbon dioxide-rich stream and a carbon dioxide-lean stream. The carbon dioxide-lean stream is introduced to the combustion chamber of the gas turbine where it is mixed with air and a fuel of $H_2$ and/or natural gas. The products of combustion of the air and fuel (in the presence of the carbon dioxide-lean stream) are expanded in the turbine. Due to the relatively higher pressure of the carbon dioxide-lean stream, more mechanical energy is recovered. If the temperature of the expanded products of combustion/carbon dioxide-lean stream mixture exiting the turbine is sufficiently high, the mixture stream may be directed to a Heat Recovery Steam Generator (HRSG) to produce additional power. During nighttime when the price of electricity is generally lower than during the daytime, the consumption of $H_2$ or natural gas may be decreased and the HRSG used as a motor to produce sufficient compression power to the gas turbine.

In the fourth embodiment, the carbon dioxide-lean stream may be warmed to a temperature ranging from approximately 100° C. to approximately 200° C. so that it is at an ambient temperature at the outlet of the turbine, preventing the loss of heat to the atmosphere and its accompanying energy.

In the fifth embodiment, the carbon dioxide-lean stream may be heated to a temperature ranging from approximately 300° C. to approximately 750° C. Such heating may be accomplished by a boiler.

In the sixth embodiment, the carbon dioxide-lean stream may be heated to a temperature ranging from approximately 1000° C. to approximately 1400° C. To reach this temperature, natural gas or liquid fuel must be burned.

As in the first through third embodiments, the carbon dioxide-rich stream is compressed (in a separate compressor) and cooled to produce a liquid vapor mixture that is subsequently separated to produce the $CO_2$ rich liquid. In these embodiments, an external refrigerant may be necessary.

Defrosting

In all embodiments, whenever pressure drop or heat transfer limitations become uneconomical and/or inefficient, a defrosting step may occasionally be utilized to remove any condensation and/or crystallization products from the gas separation membrane and, where applicable, the heat exchanger. During the defrosting step, the $CO_2$-containing gas mixture flows through the gas separation membrane and the heat exchanger at a temperature ranging from approximately 0° C. to approximately 40° C. The "warm" $CO_2$-containing gas mixture is removed prior to reaching the cryogenic phase separation step.

EXAMPLES

Example 1

Figure 2A:
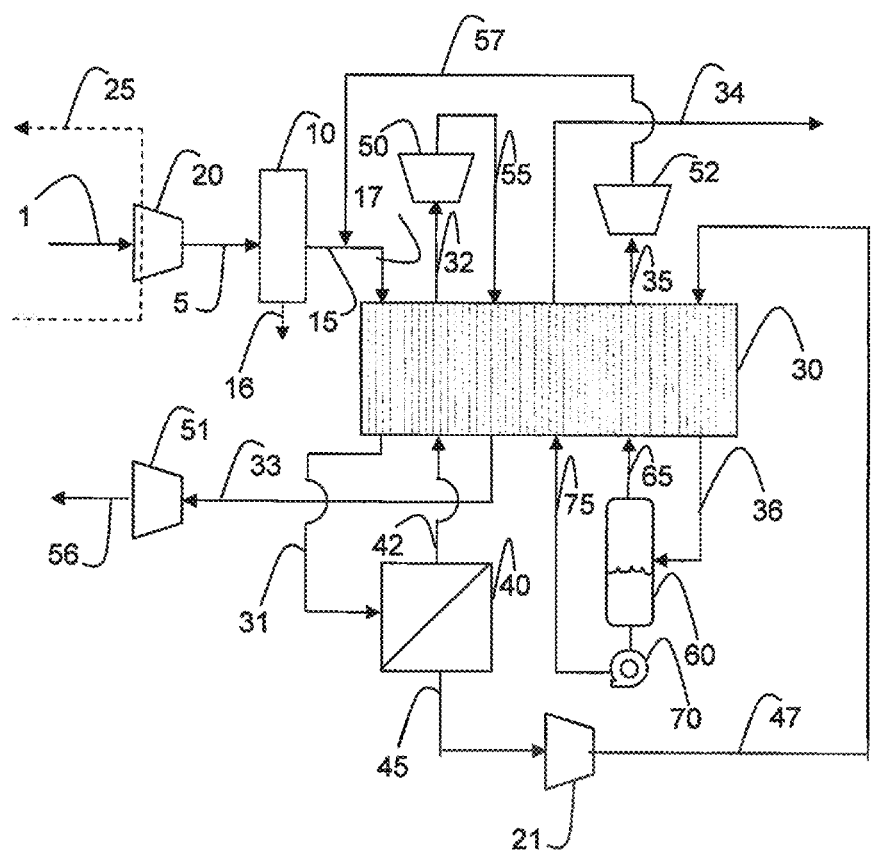
FIG. 2A is an exemplary flow diagram of the first embodiment of the disclosed method.

FIG. 2A is an exemplary flow diagram of the first embodiment of the disclosed method. A $CO_2$-containing gas mixture 1 is compressed by compressor 20 to produce a compressed $CO_2$-containing gas mixture 5. As indicated by the dotted line, the heat of compression may optionally be captured in boiler feed water 25.

The compressed $CO_2$-containing gas mixture 5 may be subject to any necessary treatment to render the mixture suitable for further processing. In FIG. 2, one such treatment is embodied as a drying step, in dryer 10. Any impurities, such as water, are removed from the compressed $CO_2$-containing gas mixture 5 in the treatment step as impurity stream 16 to the level required to prevent undesired condensation in heat exchanger 30.

The dried compressed $CO_2$-containing gas mixture 15 is then combined with stream 57 to provide stream 17 which is cooled in heat exchanger 30. Although this embodiment depicts only one heat exchanger 30, one of ordinary skill in the art will recognize that multiple heat exchangers may replace the one heat exchanger 30 shown in FIG. 2. The cooled, dried, compressed $CO_2$-containing gas mixture 31 flows into gas separation membrane 40 to produce a carbon dioxide-lean stream 42 and a carbon dioxide-rich stream 45 at a lower pressure.

Depending upon whichever other process streams are in heat exchange relationship with the carbon dioxide-lean stream 42, the stream 42 may be warmed by and provides cooling to heat exchanger 30 or is cooled by and provides warth to heat exchanger 30. The carbon dioxide-lean stream 32 is then subjected to expansion by turboexpander 50. The resulting cold carbon dioxide-lean stream 55 is warmed by and provides cooling to heat exchanger 30. If, after passing through the heat exchanger 30, any excess pressure remains in the warmed expanded carbon dioxide-lean stream 33, the stream may be expanded at turboexpander 51 for mechanical energy recovery and the de-pressurized carbon dioxide-lean stream 56 may then be vented.

The carbon dioxide-rich stream 45 is compressed by compressor 21. The compressed carbon dioxide-rich stream 47 is partially condensed in heat exchanger 30 to provide biphasic liquid/vapor carbon dioxide. The biphasic liquid/vapor carbon dioxide is subjected to phase separation in vapor liquid separator 60. $CO_2$ rich liquid 75 is pumped by pump 70 from the separator 60 to the heat exchanger 30. The warmed $CO_2$ rich liquid 34 is typically provided at greater than approximately 60 bar and at approximately 20° C.

The separator 60 also yields $CO_2$ lean vapor stream 65. $CO_2$ lean vapor stream 65 is warmed in and provides cooling to heat exchanger 30. The warmed $CO_2$ lean vapor stream undergoes expansion in turboexpander 52. The warmed, expanded $CO_2$ lean vapor stream 57 is mixed with dried, compressed $CO_2$-containing gas mixture 15 prior to being cooled by heat exchanger 30. This recycle increases the $CO_2$ concentration of the feed 31 to the membrane.

The process of FIG. 2A was simulated using chemical engineering simulation software HYSIS for air-fired combustion of coal. As seen in FIG. 2B, starting with a flue gas derived from air-fired combustion and utilizing the process of FIG. 2A, the system provides a liquid product 34 having a carbon dioxide concentration of 97.2%.

Figure 2C:
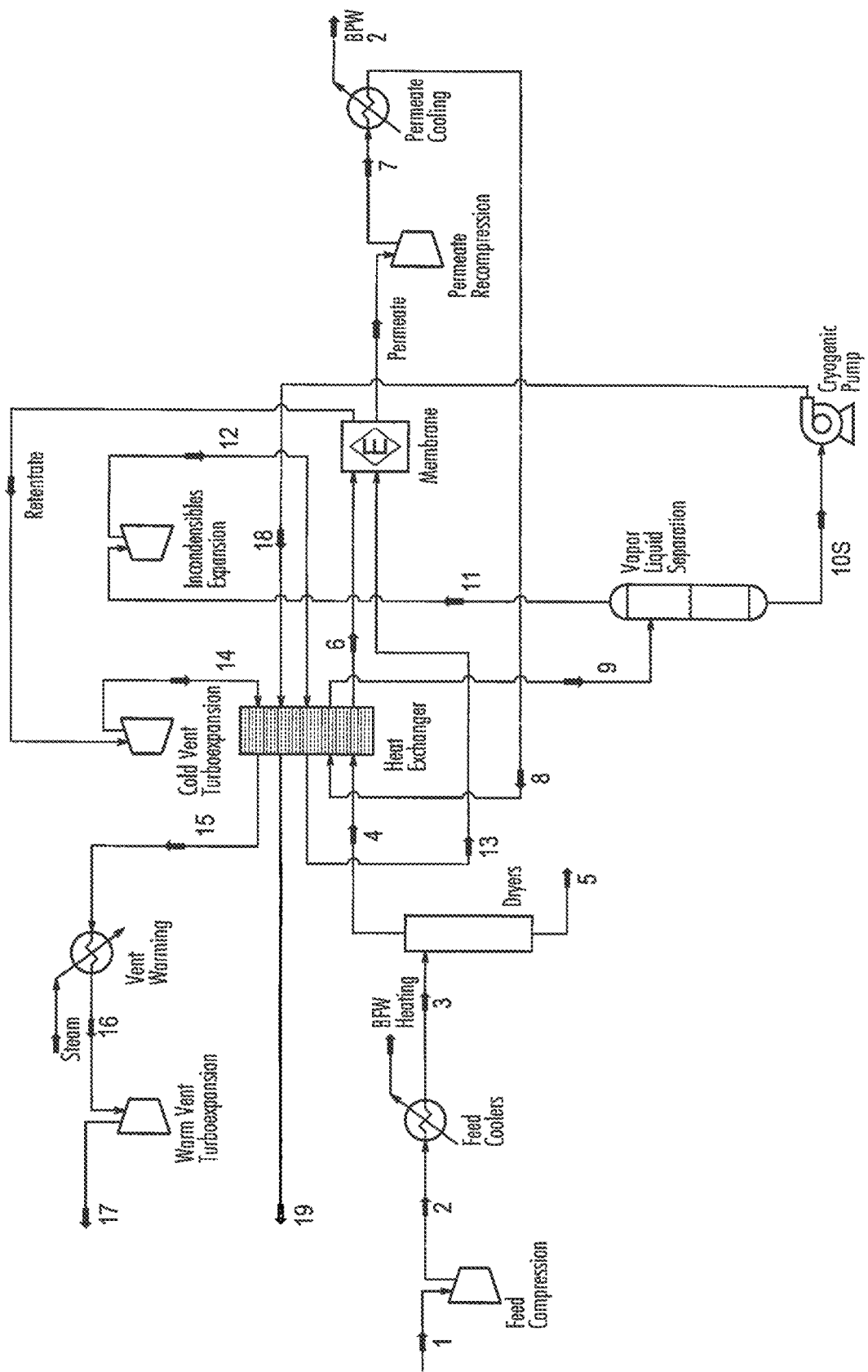
FIG. 2C is an exemplary flow diagram of a variation of the first embodiment of the disclosed method.

FIG. 2C is an exemplary flow diagram of a variation of the first embodiment of the disclosed method that was simulated using chemical engineering simulation software HYSIS. Substantively, the scheme of FIG. 2B differs from that of FIG. 2A in that the $CO_2$-lean vapor stream from the cryogenic phase separator is expanded before being cooled in the common heat exchanger and combined with the dried compressed $CO_2$-containing gas mixture after cooling. Flue gas 1 is pressurized using axial compression to knock out water and provide a compressed flue gas 2. Multistage compression is required to reach the 16 bar feed pressure. The heat of the compression is removed by preheating boiler feed water to yield a cooled compressed $CO_2$-containing gas mixture 3. After compression, the gas is cooled and dried using silica gel to provide a dried feed gas 4. This gas 4 is cooled using a high efficiency finned multi-stream heat exchanger and fed to the membrane as cooled feed gas 6. The $CO_2$ lean non-permeate (retentate) stream is then cryogenically turbo-expanded in a series of steps, and passed through the heat exchanger as a cold stream 14. The remaining pressure is then expanded in a heated turbo-expander (which recovers energy more efficiently than a cryogenic turbo-expander) to yield vent stream 17. The $CO_2$ rich permeate is compressed to provide a compressed $CO_2$ rich permeate 7. After partial cooling, the now warm permeate 8 is re-cooled in the heat exchanger. This stream is cooled until partial condensation occurs to provide partially condensed permeate 9 and separated in a vapor liquid separator. The 95+% $CO_2$ liquid condensate 10S is then pumped by a cryogenic pump to a pressure where it maintains a liquid state at room temperature to provide stream 18, and then this stream 18 is warmed in the heat exchanger to provide liquid carbon dioxide product 19. The incondensible vapor 11 is expanded to the feed pressure of the membrane to provide stream 12, and warmed in the heat exchanger to the feed temperature of the membrane. The vapor is recycled back to the membrane to provide recycled incondensible vapor 13 which operates as a sweep gas to drive permeation of carbon dioxide from the cooled feed gas 6 across the membrane.

Assuming the initial conditions for the flue gas 1, the HYSIS simulation yielded the temperature, pressure, flow, and carbon dioxide concentration conditions in Table 2.

TABLE 2

Air-Fired Combustion of Coal

| | Stream # | | | | | | |
|---|---|---|---|---|---|---|---|
| | 1 | 2 | 3 | 4 | 6 | 13 | 6 + 13 |
| Temperature [C.] | 57.2 | 20.0 | 6.5 | 10.0 | −30.0 | −30.0 | −30.0 |
| Pressure [bar] | 1.0 | 16.2 | 16.1 | 16.1 | 16.1 | 16.1 | 16.1 |
| Molar Flow [Nm³/h] | 1000 | 840 | 836 | 835 | 835 | 71 | 906 |
| $CO_2$ Concentration | 14.1% | 16.8% | 16.9% | 16.9% | 16.9% | 32.3% | 18.1% |

| | Stream # | | | | | |
|---|---|---|---|---|---|---|
| | Ret | Perm | 9 | 10 | 11 | 17 | 19 |
| Temperature [C.] | −30.0 | −30.0 | −55.0 | −55.0 | −55.0 | 15.0 | 8.0 |
| Pressure [bar] | 15.5 | 1.2 | 19.8 | 19.8 | 19.8 | 1.0 | 54.5 |
| Molar Flow [Nm³/h] | 705 | 202 | 202 | 131 | 71 | 705 | 131 |
| $CO_2$ Concentration | 1.9% | 74.6% | 74.6% | 97.4% | 32.3% | 1.9% | 97.4% |

As seen in Table 2, with little additional cooling, the system provides a liquid product 19 having a carbon dioxide concentration of 97.4%.

Example 2

A $CO_2$-containing gas mixture having 30% $CO_2$ with a balance of $N_2$ was fed to membranes comprising the Matrimid® and/or P84® polyimides. The data are plotted in FIGS. 3 through 8 as normalized values with reference to the performance at ambient temperature. The normalized $CO_2$ GPU equals the $CO_2$ GPU at cold temperature divided by the reference $CO_2$ GPU for the same membrane at 22° C. and the normalized $CO_2/N_2$ selectivity equals the $CO_2/N_2$ selectivity at cold temperature divided by the reference $CO_2/N_2$ selectivity for same membrane at 22° C. The reference $CO_2/N_2$ selectivity at 22° C. for the membrane comprising the Matrimid® polyimide is 36. The reference $CO_2$ GPU at 22° C. for the membrane comprising the Matrimid® and P84® polyimides is 74 and its reference $CO_2/N_2$ selectivity is 39.

Figure 3:
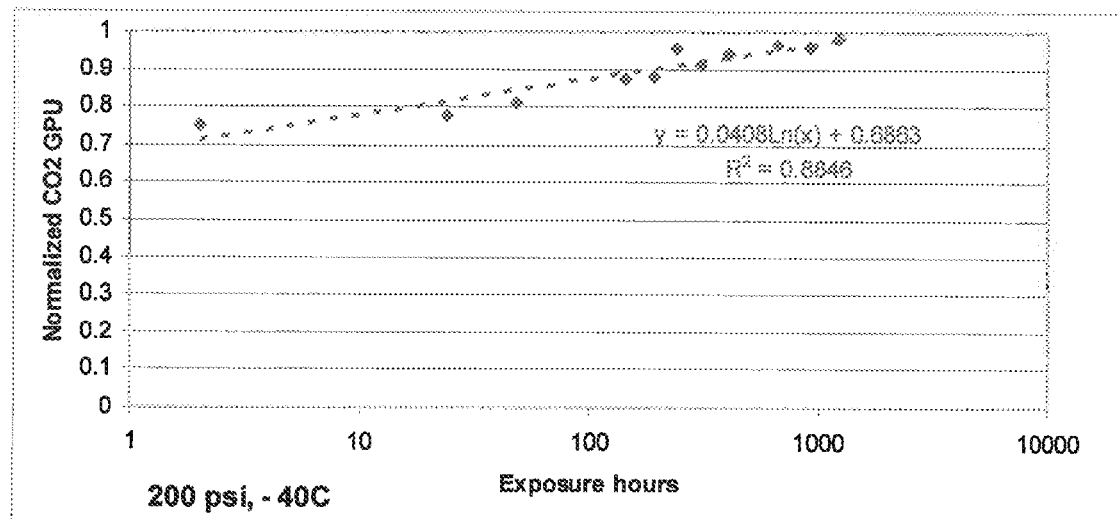
FIG. 3 is a graphical representation of normalized $CO_2$ GPU over time.
Figure 4:
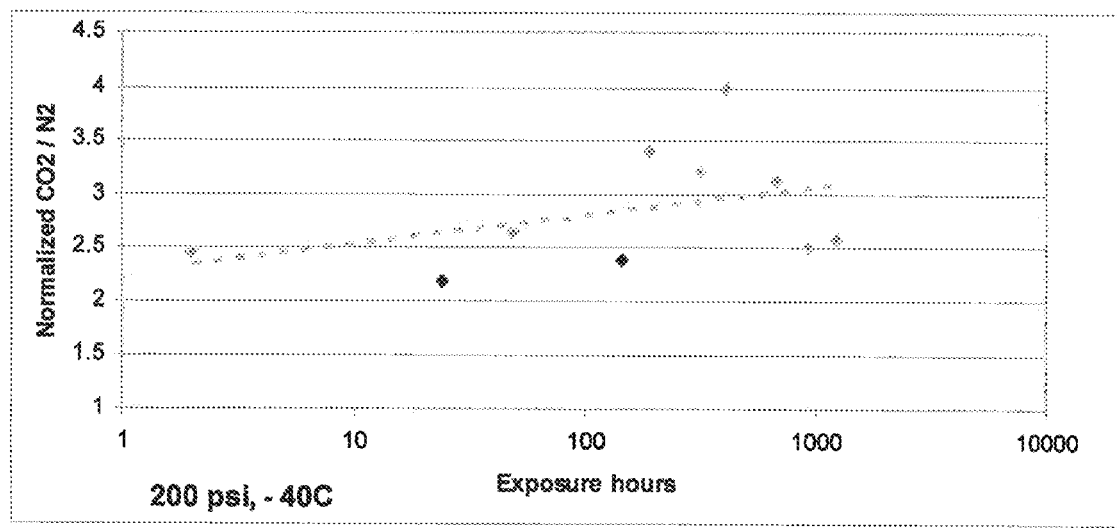
FIG. 4 is a graphical representation of normalized $CO_2/N_2$ selectivity over time.

The results in FIGS. 3 and 4 for a membrane comprising the Matrimid® polyimide show increasing flux (approximately a 25% increase) and selectivity over the first 100 hrs at 200 psi, −40° C., and 196 reference $CO_2$ GPU. After 1000 hrs, the permeance at −40° C. approaches the room temperature permeance value with selectivity three times higher than the room temperature selectivity value.

Figures 5, 6:
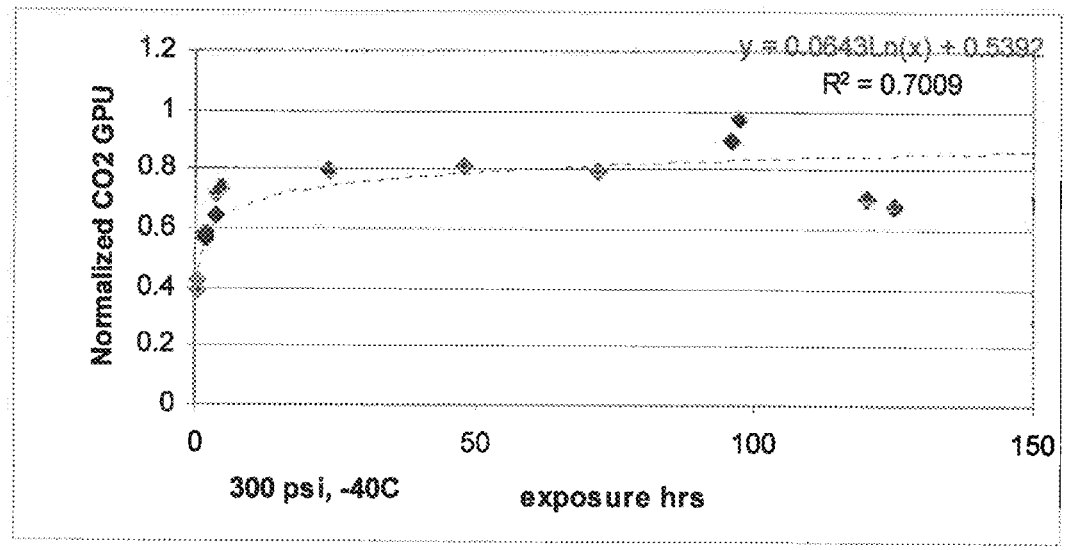
FIG. 5 is a graphical representation of normalized $CO_2$ GPU over time.
FIG. 6 is a graphical representation of normalized $CO_2/N_2$ selectivity over time.

The results in FIGS. 5 and 6 for a membrane comprising the Matrimid® polyimide show increasing flux (approximately a 55% increase) and selectivity over the first 100 hours at 300 psi, −40° C., and 160 reference $CO_2$ GPU. During the testing, feed gas pressure variation developed and therefore the last two data points are not representative. Discounting these data points, the increase in flux is approximately 150%.

Figure 7:
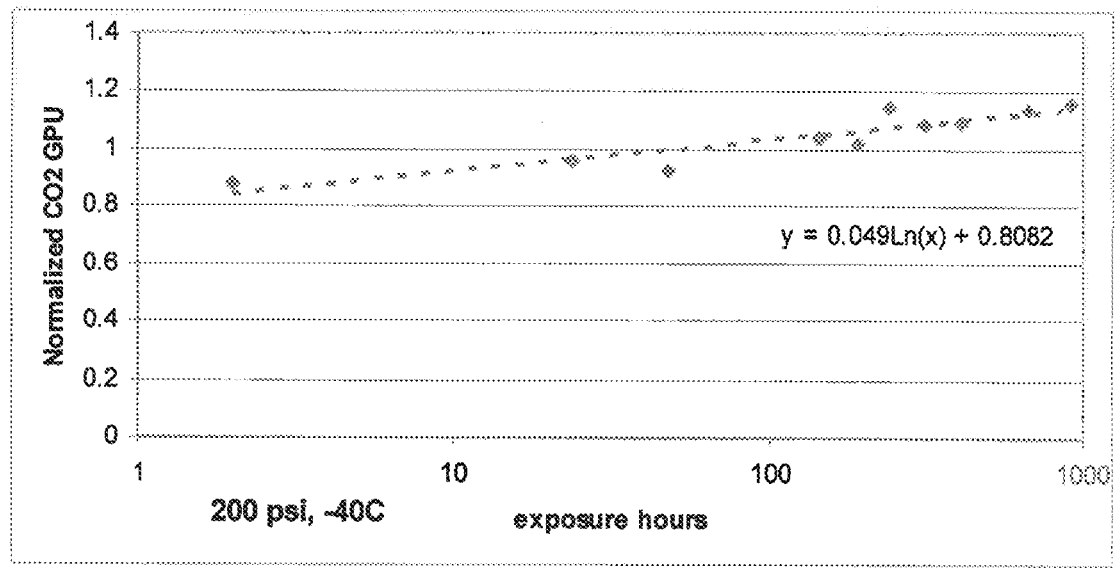
FIG. 7 is a graphical representation of normalized $CO_2$ GPU over time.
Figure 8:
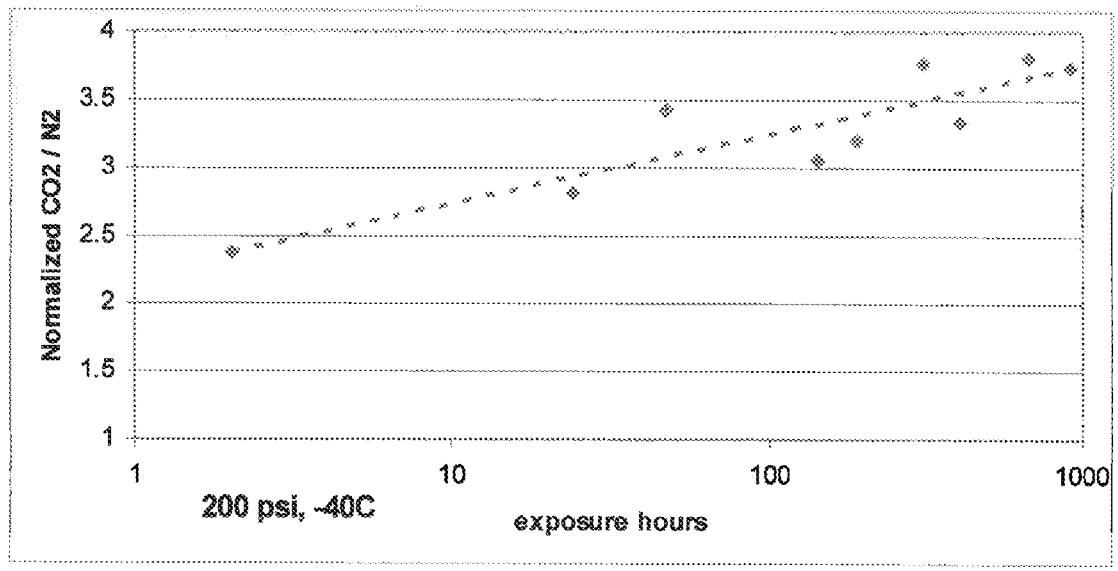
FIG. 8 is a graphical representation of normalized $CO_2/N_2$ selectivity over time.

The results in FIGS. 7 and 8 for a membrane comprising the Matrimid® and P84® polyimides show increasing flux (approximately a 25% increase) and selectivity over the first 100 hours at 200 psi and −40° C. After 1000 hrs, the permeance at low temperature exceeds the room temperature permeance value with selectivity 3.5 times higher than the room temperature selectivity value.

In all of the testing, the $CO_2$ permeance rises with time, implying polymer/gas interactions. However, the selectivity remains roughly constant or increases, which discounts classical plasticization as a mechanism.

Example 3

Figure 9A:
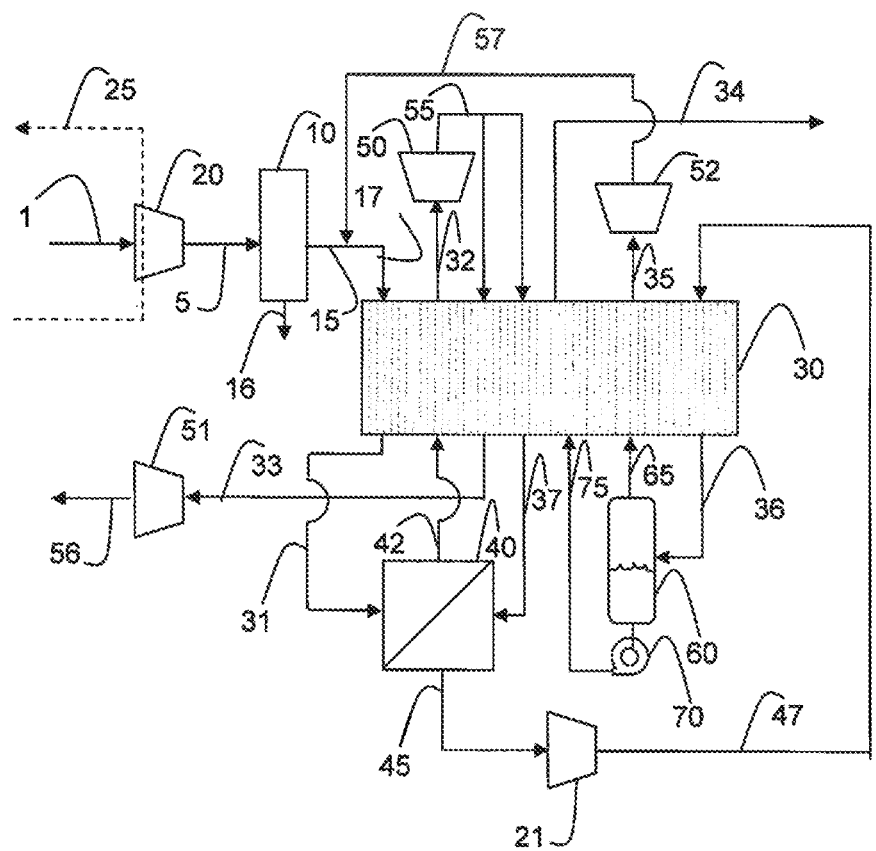
FIG. 9A is another exemplary flow diagram of the first embodiment of the disclosed method.

FIG. 9A depicts an exemplary flow diagram of a variation of the first embodiment of the disclosed method. In this example, after being warmed by and providing cooling to heat exchanger 30, a portion of the cold carbon dioxide-lean stream 55 is utilized as a sweep stream 37 in the gas separation membrane 40 to lower the partial pressure of $CO_2$ permeating through the membrane 40 from the cooled and compressed $CO_2$-containing gas mixture 31.

The process of FIG. 9A was simulated using chemical engineering simulation software HYSIS for four different schemes: a) air-fired combustion of coal, b) partial oxycombustion of coal with high air infiltration, c) partial oxycombustion of coal with low air infiltration, and d) full oxycombustion of coal.

As seen in FIG. 9B, starting with a flue gas derived from air-fired combustion and utilizing the process of FIG. 9A, the system provides a liquid product 34 having a carbon dioxide concentration of 97.4%.

As seen in Table 3, starting with a flue gas derived from partial oxycombustion of coal with high air infiltration and utilizing the process of FIG. 9A, the system provides a liquid product 34 having a carbon dioxide concentration of 98.07%.

TABLE 3

| Partial Oxycoal Combustion With High Air Infiltration | | | | | | | | |
|---|---|---|---|---|---|---|---|---|
| | Stream # | | | | | | | |
| | 1 | 31 | 37 | 42 | 45 | 36 | 34 | 65 |
| Vapor Phase Fraction | 1 | 1 | 1 | 1 | 1 | 0.26 | 0 | 1 |
| Temp (° C.) | 58 | −40 | −40 | −59.2 | −59.2 | −54 | 20 | −54 |
| Pressure (bar) | 1.1 | 15.9 | 2.9 | 15.3 | 2.9 | 16.3 | 150.0 | 16.3 |
| Molar Flow (Nm³/h (gas)) | 1000 | 935 | 40 | 559 | 416 | 416 | 307 | 109 |
| Mass Flow (kg/h) | 1424 | 1453 | 50 | 736 | 768 | 768 | 599 | 169 |
| Molar fractions | | | | | | | | |
| % $N_2$ (v/v) | 44.40 | 53.32 | 95.0 | 85.4 | 14.19 | 14.19 | 1.45 | 50.03 |
| % O2 (v/v) | 3.40 | 4.74 | 5.00 | 6.21 | 2.79 | 2.79 | 0.41 | 9.48 |
| % Argon (v/v) | 1.60 | 1.85 | 0.00 | 2.82 | 0.37 | 0.37 | 0.08 | 1.19 |
| % $CO_2$ (v/v) | 33.20 | 40.09 | 0.00 | 5.56 | 82.66 | 82.66 | 98.07 | 39.30 |
| % $H_2O$ (v/v) | 17.40 | 0.00 | 0.00 | 0.00 | 0.00 | 0.00 | 0.00 | 0.00 |

As seen in Table 4, starting with a flue gas derived from partial oxycombustion of coal with low air infiltration and utilizing the process of FIG. 9A, the system provides a liquid product 34 having a carbon dioxide concentration of 98.76%.

TABLE 4

Partial Oxycoal Combustion With High Air Infiltration

| | Stream # | | | | | | |
|---|---|---|---|---|---|---|---|
| | 1 | 31 | 37 | 42 | 45 | 36 | 34 | 65 |
| Vapor Phase Fraction | 1 | 1 | 1 | 1 | 1 | 0.23 | 0 | 1 |
| Temp (° C.) | 58 | −40 | −40 | −49.2 | −49.2 | −54 | 20 | −54 |
| Pressure (bar) | 1.1 | 11.4 | 3.0 | 10.8 | 3.0 | 12.3 | 150.0 | 12.3 |
| Molar Flow (Nm³/h (gas)) | 1000 | 952 | 40 | 436 | 557 | 557 | 431 | 125 |
| Mass Flow (kg/h) | 1525 | 1590 | 50 | 593 | 1048 | 1048 | 843 | 205 |
| % $N_2$ (v/v) | 29.94 | 36.62 | 95.00 | 76.63 | 9.51 | 9.51 | 0.86 | 39.25 |
| % $O_2$ (v/v) | 3.76 | 5.21 | 5.00 | 8.78 | 2.39 | 2.39 | 0.31 | 9.54 |
| % Argon (v/v) | 2.00 | 2.28 | 0.00 | 4.52 | 0.37 | 0.37 | 0.07 | 1.39 |
| % $CO_2$ (v/v) | 46.96 | 55.89 | 0.00 | 10.07 | 87.73 | 87.73 | 98.76 | 49.82 |
| % $H_2O$ (v/v) | 17.34 | 0.00 | 0.00 | 0.00 | 0.00 | 0.00 | 0.00 | 0.00 |

As seen in FIG. 9E, starting with a flue gas derived from air full oxycombustion of coal and utilizing the process of FIG. 9A, the system provides a liquid product 34 having a carbon dioxide concentration of 98.68%.

TABLE 5

Fully Oxycoal Combustion

| | Stream # | | | | | | |
|---|---|---|---|---|---|---|---|
| | 1 | 31 | 37 | 42 | 45 | 36 | 34 | 65 |
| Vapor Phase Fraction | 1 | 1 | 1 | 1 | 1 | 0.14 | 200 | 1 |
| Temperature (° C.) | 57 | −40 | −40 | −47.5 | −47.5 | −54 | 20 | −54 |
| Pressure (bar) | 1.05 | 8.9 | 3.4 | 8.4 | 3.42 | 12.3 | 150.0 | 12.3 |
| Molar Flow (Nm³/h (gas)) | 1000 | 1034 | 30 | 340 | 724 | 724 | 621 | 103 |
| Mass Flow (kg/h) | 1725 | 1839 | 38 | 493 | 1384 | 1384 | 1215 | 169 |
| % $N_2$ (v/v) | 18.06 | 20.80 | 95.0 | 60.17 | 5.38 | 5.38 | 0.73 | 33.44 |
| % $O_2$ (v/v) | 4.59 | 5.87 | 5.00 | 13.10 | 2.43 | 2.43 | 0.47 | 14.31 |
| % Argon (v/v) | 2.69 | 2.85 | 0.00 | 7.70 | 0.46 | 0.46 | 0.12 | 2.49 |
| % $CO_2$ (v/v) | 67.76 | 70.48 | 0.00 | 19.03 | 91.73 | 91.73 | 98.68 | 49.76 |
| % $H_2O$ (v/v) | 6.89 | 0.00 | 0.00 | 0.00 | 0.00 | 0.00 | 0.00 | 0.00 |

Thus, regardless of whether the process of FIG. 9A is retrofitted for existing air-fired coal power plants, retrofitted with partial oxycombustion on existing air-fired coal power plant, implemented in a partial oxycombustion coal power plant, or implemented in a full oxycombustion coal power plant, the process of FIG. 9A achieves in each case a $CO_2$ purity of at least 97%.

Example 4

Under certain feed conditions, computer models indicate that the disclosed method is more energy efficient and requires less membrane area when employing a sweep stream having a low $CO_2$ concentration. In the computer model, a comparison of the method with (the sweep case) and without (the base case) a sweep stream was set to provide 90% recovery of $CO_2$. The sweep stream utilized was 3.5% of the expanded carbon dioxide-lean stream. The fiber performance was set to 90 GPU $CO_2$/1 GPU $N_2$/2 GPU Ar/6 GPU $O_2$. The energy (in KWhr/ton) is defined to be the amount of energy required to process 1 ton of $CO_2$ capture.

The base case requires an net energy consumption of 200 kWhr/ton CO2 compared to 196 kWhr/ton $CO_2$ for the sweep case. The sweep case also requires 29% less membrane area than the base case.

Example 5

Figure 10A:
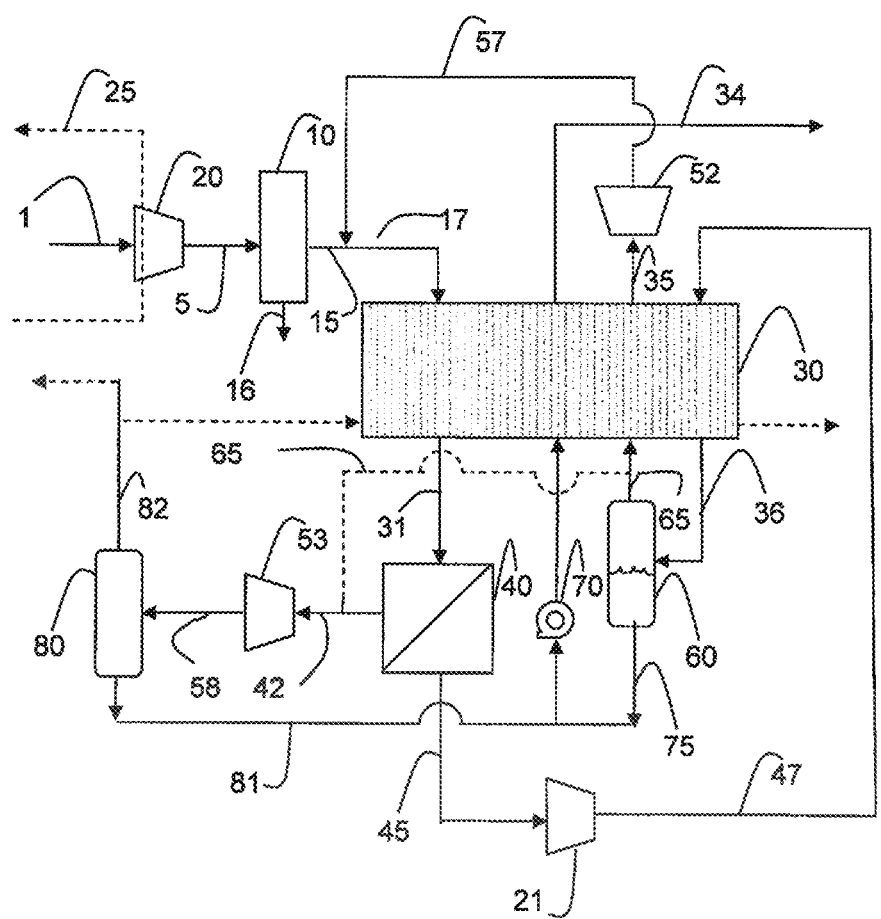
FIG. 10A is an exemplary flow diagram of the second embodiment of the disclosed method.

FIG. 10A depicts an exemplary flow diagram of the second embodiment of the disclosed method. In this embodiment, the warmed carbon dioxide-lean stream 32, the turboexpander 50, the cold carbon dioxide-lean stream 55, the warmed expanded carbon dioxide-lean stream 33, the turboexpander 51, and the de-pressurized carbon dioxide-lean stream 56 of FIG. 2 have been removed. In this embodiment, the carbon dioxide-lean stream 42 is expanded in a cryogenic turboexpander 53 to produce a biphasic solid/gaseous carbon dioxide-lean stream 58.

The biphasic solid/gaseous carbon dioxide-lean stream 58 exits the turboexpander 53 and is directed into gas/solid separator 80, yielding $CO_2$ snow 81 and $CO_2$ depleted gas 82. As indicated by the dotted lines, the $CO_2$ depleted gas 82 may be vented, may be utilized to provide additional cooling to the heat exchanger 30, or a combination of both. The $CO_2$ snow is mixed with $CO_2$ rich liquid 75 prior to pump 70.

As with the first embodiment, after a reduction in its pressure, a portion of the carbon dioxide-lean stream 58 may be utilized as a sweep stream (not shown) in the gas separation membrane 40 to lower the partial pressure of $CO_2$ permeating through the membrane 40 from the cooled and compressed $CO_2$-containing gas mixture 31. Similarly, the $CO_2$ depleted gas 82 may used as a sweep stream (not shown).

Figure 10B:
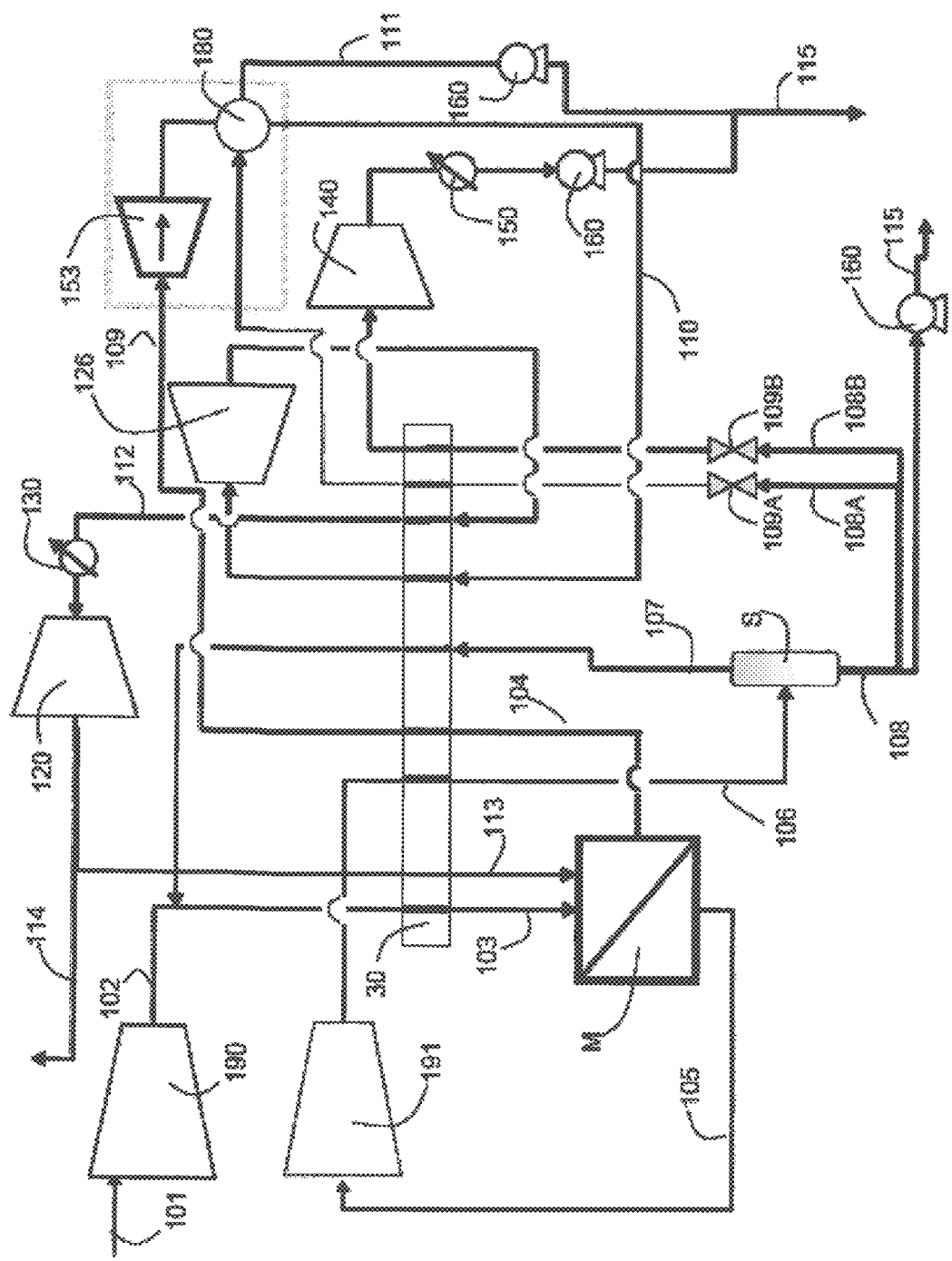
FIG. 10B is an exemplary flow diagram of a variation of the second embodiment of the disclosed method.

FIG. 10B depicts an exemplary flow diagram of a variation of the second embodiment of the disclosed method. A $CO_2$-containing gas mixture 101 is compressed by compressor 190 to produce a compressed $CO_2$-containing gas mixture 102. The heat of compression may optionally be captured in boiler feed water.

The compressed $CO_2$-containing gas mixture 102 may be subject to any necessary treatment to render the mixture suitable for further processing. Any impurities, such as water, are removed from the compressed $CO_2$-containing gas mixture 102 to the level required to prevent undesired condensation in heat exchanger 30.

The dried compressed $CO_2$-containing gas mixture 102 is then combined with stream 107 and cooled in heat exchanger 30. Although this embodiment depicts only one heat exchanger 30, one of ordinary skill in the art will recognize that multiple heat exchangers may replace the one heat exchanger 30 shown in FIG. 10B. The cooled, dried, compressed $CO_2$-containing gas mixture 103 flows into gas separation membrane M to produce a carbon dioxide-lean stream 104 and a carbon dioxide-rich stream 105 at a lower pressure.

The carbon dioxide-lean stream 104 is cooled by heat exchanger 30. The cooled carbon dioxide-lean stream 109 is then subjected to expansion by cryogenic turboexpander 153 to produce solid carbon dioxide and a $CO_2$-depleted gas in phase separator 180.

The $CO_2$-depleted gaseous stream 110 from phase separator 180 is then warmed at heat exchanger 30 and expanded at cold expander 126. The expanded $CO_2$-depleted gaseous stream 110 is again warmed by the heat exchanger 30 to provide lower-pressure $CO_2$-depleted stream 112. This stream 112 is heated with steam 130 and expanded at hot expander 120 to ambient or near-ambient pressure. The lower pressure, expanded stream 114 may be vented or a portion or all of the lower pressure, expanded stream 114 may be directed to the permeate side of the membrane M where it is utilized as a sweep stream in the gas separation membrane M to lower the partial pressure of $CO_2$ permeating through the membrane M from the cooled and compressed $CO_2$-containing gas mixture 103.

The carbon dioxide-rich stream 105 is compressed by compressor 191. The compressed carbon dioxide-rich stream 105 is partially condensed by cooling in heat exchanger 30. The partially condensed carbon dioxide-rich stream 106 is directed to liquid vapor separator S. A portion of the $CO_2$ rich liquid 108 is pumped by pump 160 to provide liquid carbon dioxide product 115. Two portions 108A, 108B of the $CO_2$ rich liquid 108 are pressure-reduced at pressure reduction valves 109A, 109B and vaporized by heat exchanger 30. The first portion of vaporized carbon dioxide rich liquid is directed to phase separator 180 where it liquefies the solid carbon dioxide to provide liquid carbon dioxide stream 111. The second portion of vaporized carbon dioxide rich liquid is expanded at expander 140 and condensed with cooling water 150 to provide an additional stream of liquid carbon dioxide. This additional stream of liquid carbon dioxide is pumped by pump 160 and combined with liquid carbon dioxide stream 111 to provide another source of the liquid carbon dioxide product 115.

The process of FIG. 10B was simulated using chemical engineering simulation software HYSIS to yield the following vapor fraction, temperature, pressure, flow, and mole fraction values recited in Table 6.

TABLE 6

Solid Condensation and Liquefaction

| | | Stream # | | | | |
| --- | --- | --- | --- | --- | --- | --- |
| | | 101 | 102 | 103 | 104 | 105 |
| Vapor Fraction | % | 100% | 100% | 100% | 100% | 100% |
| Temperature | C. | 50.00 | 6.49 | −30.00 | −30.69 | −30.00 |
| Pressure | bar a | 1.05 | 12.00 | 11.90 | 11.39 | 1.50 |
| Molar Flow | Nm3/h | 1,000 | 834 | 904 | 756 | 177 |
| Mass Flow | kg/h | 1,279 | 1,146 | 1,246 | 975 | 309 |
| Mole ($N_2$) | % | 66.95% | 80.23% | 79.33% | 91.77% | 28.84% |
| Mole ($O_2$) | % | 2.32% | 2.78% | 3.13% | 3.12% | 3.19% |
| Mole (Ar) | % | 0.80% | 0.96% | 0.97% | 1.08% | 0.50% |
| Mole ($CO_2$) | % | 13.30% | 15.93% | 16.57% | 4.03% | 67.48% |
| Mole ($H_2O$) | % | 16.63% | 0.10% | 0.00% | 0.00% | 0.00% |
| | | Stream # | | | | |
| | | 106 | 107 | 108 | 109 | 110 |
| Vapor Fraction | % | 39% | 100% | 0% | 100% | 100% |
| Temperature | C. | −55.00 | −55.00 | −55.00 | −87.78 | −104.91 |
| Pressure | bar a | 29.85 | 29.85 | 29.85 | 11.29 | 5.00 |
| Molar Flow | Nm3/h | 177 | 70 | 108 | 756 | 737 |
| Mass Flow | kg/h | 309 | 101 | 208 | 975 | 938 |
| Mole ($N_2$) | % | 28.84% | 67.70% | 3.61% | 91.77% | 94.06% |
| Mole ($O_2$) | % | 3.19% | 7.24% | 0.57% | 3.12% | 3.20% |
| Mole (Ar) | % | 0.50% | 1.07% | 0.12% | 1.08% | 1.11% |
| Mole ($CO_2$) | % | 67.48% | 24.00% | 95.70% | 4.03% | 1.63% |
| Mole ($H_2O$) | % | 0.00% | 0.00% | 0.00% | 0.00% | 0.00% |

TABLE 6-continued

Solid Condensation and Liquefaction

| | | Stream # | | | | |
|---|---|---|---|---|---|---|
| | | 111 | 112 | 113 | 114 | 115 |
| Vapor Fraction | % | 0% | 100% | 100% | 100% | 0% |
| Temperature | C. | −55.86 | 11.02 | −34.03 | 48.32 | 16.76 |
| Pressure | bar a | 5.20 | 4.02 | 1.53 | 1.01 | 75.00 |
| Molar Flow | Nm3/h | 18 | 708 | 29 | 708 | 126 |
| Mass Flow | kg/h | 36 | 901 | 38 | 901 | 244 |
| Mole ($N_2$) | % | 0.00% | 94.06% | 94.06% | 94.06% | 3.08% |
| Mole ($O_2$) | % | 0.00% | 3.20% | 3.20% | 3.20% | 0.48% |
| Mole (Ar) | % | 0.00% | 1.11% | 1.11% | 1.11% | 0.11% |
| Mole ($CO_2$) | % | 100.00% | 1.63% | 1.63% | 1.63% | 96.32% |
| Mole ($H_2O$) | % | 0.00% | 0.00% | 0.00% | 0.00% | 0.00% |

As seen in Table 6, starting with a flue gas having the above properties, the process of FIG. 10B provides a liquid product 34 having a carbon dioxide concentration of 96.32% with little additional cooling.

Example 6

Figure 11:
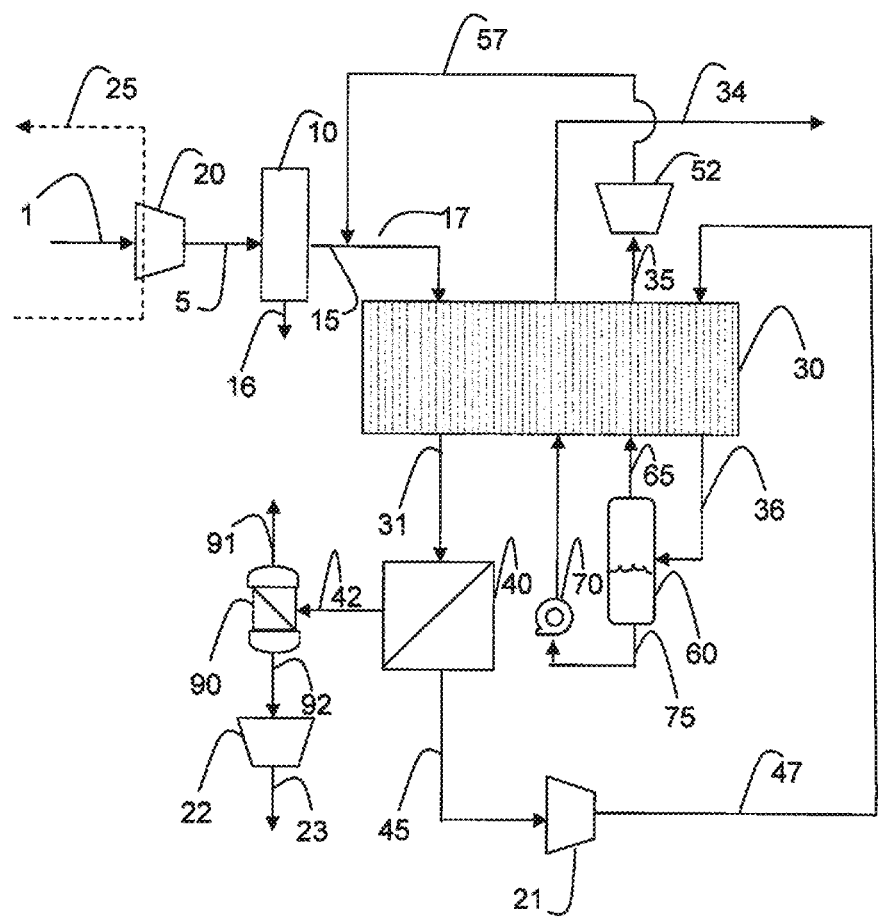
FIG. 11 is an exemplary flow diagram of the third embodiment of the disclosed method.

FIG. 11 depicts an exemplary flow diagram of the third embodiment of the disclosed method. In this embodiment, the warmed carbon dioxide-lean stream 32, the turboexpander 50, the cold carbon dioxide-lean stream 55, the warmed expanded carbon dioxide-lean stream 33, the turboexpander 51, and the de-pressurized carbon dioxide-lean stream 56 of FIG. 2 have been removed. In this embodiment, the carbon dioxide-lean stream 42 is swept over an absorption vessel 90. One of ordinary skill in the art will recognize, that although only one absorption vessel 90 is depicted in FIG. 11, that multiple absorption vessels may be utilized.

During the adsorption step, the adsorption vessel 90 produces a $CO_2$ lean absorption stream 91. During the desorption step, the adsorption vessel 90 produces a $CO_2$ rich stream 92. The treated $CO_2$ lean stream 91 may be sent to vent. The desorbed $CO_2$ rich stream 92 is compressed in compressor 22 to produce a product $CO_2$ stream, which may be sequestered or used elsewhere.

Example 7

Figure 12A:
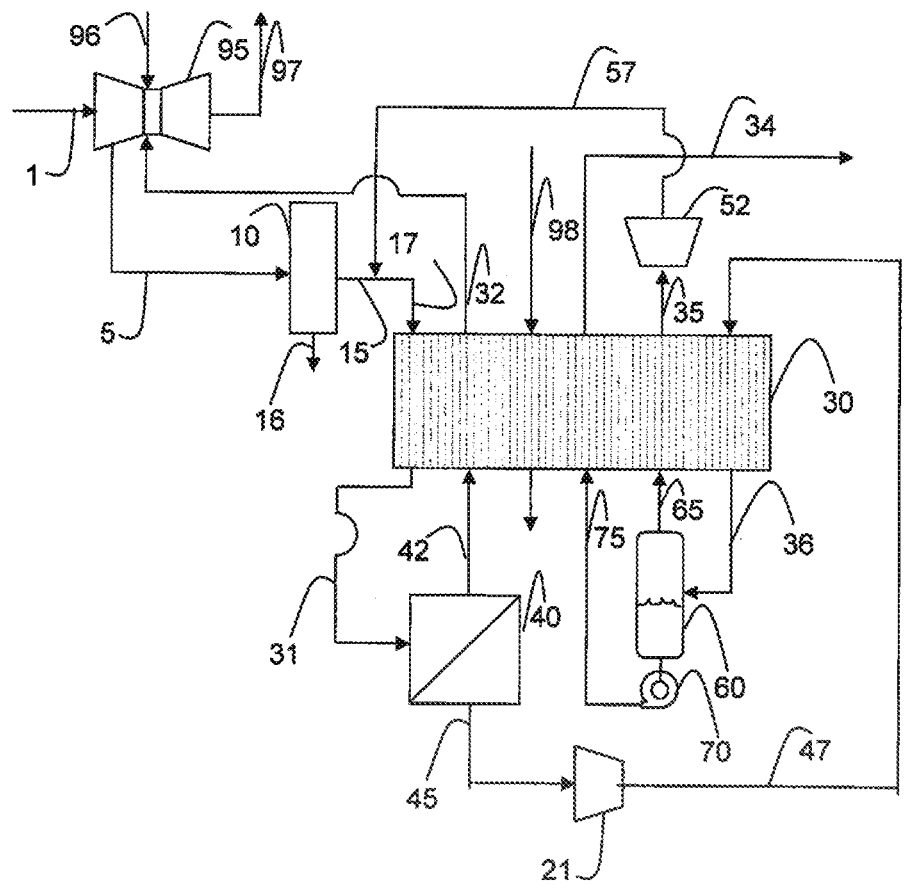
FIG. 12A is an exemplary flow diagram of the fourth through sixth embodiments of the disclosed method.

FIG. 12A depicts an exemplary flow diagram of the fourth through sixth embodiments of the disclosed method. In these embodiments, the compressor 20, the turboexpander 50, the cold carbon dioxide-lean stream 55, the warmed expanded carbon dioxide-lean stream 33, the turboexpander 51, and the de-pressurized carbon dioxide-lean stream 56 of FIG. 2 have been removed. In these embodiments, the compressor 20 has been replaced by modified gas turbine 95.

The $CO_2$-containing gas mixture 1 is compressed by the modified gas turbine 95 to produce a compressed $CO_2$-containing gas mixture 5. Any impurities, such as water, are removed from the compressed $CO_2$-containing gas mixture 5 in a treatment step, such as dryer 10, as impurity stream 16 to the level required to prevent undesired condensation in heat exchanger 30.

The dried compressed $CO_2$-containing gas mixture 15 is cooled in heat exchanger 30. Although this embodiment schematically depicts only one heat exchanger 30, one of ordinary skill in the art will recognize that multiple heat exchangers may replace the single heat exchanger 30 schematically shown in FIG. 12A. The cooled, dried, compressed $CO_2$-containing gas mixture 31 flows into gas separation membrane 40 to produce a carbon dioxide-lean stream 42 and a carbon dioxide-rich stream 45 at a lower pressure. Processing of the carbon dioxide-rich stream 45 occurs as described with respect to FIG. 2, except that a cooling source 98 may be required to provide sufficient cooling to the heat exchanger 30. Suitable cooling sources 98 may include liquid nitrogen, part of the warmed $CO_2$ rich liquid 34, or other cooling sources known in the art.

The carbon dioxide-lean stream 42 is warmed by and provides cooling to heat exchanger 30. The warmed carbon dioxide-lean stream 32 returns to the modified gas turbine 95 where it may be combined with a second component 96. The second component includes air and a fuel of $H_2$ and/or natural gas. The combined warmed carbon dioxide-lean stream 32/second component 96 are directed to a combustion chamber associated with the modified gas turbine 95 whereat the fuel is combusted with the air in the presence of the warmed carbon dioxide-lean stream. The products of combustion, at enhanced pressure due to the presence of the relatively higher pressure carbon dioxide-lean stream, are expanded at the modified gas turbine 95 to produce mechanical energy for compression of the $CO_2$-containing gas mixture 1. The expanded gas 97 may be vented with or without first being used to preheat the air and fuel. The expanded gas 97 can also be cooled in the heat exchanger 30 and utilized as a sweep gas on the permeate side of the gas separation membrane 40.

Figure 12B:
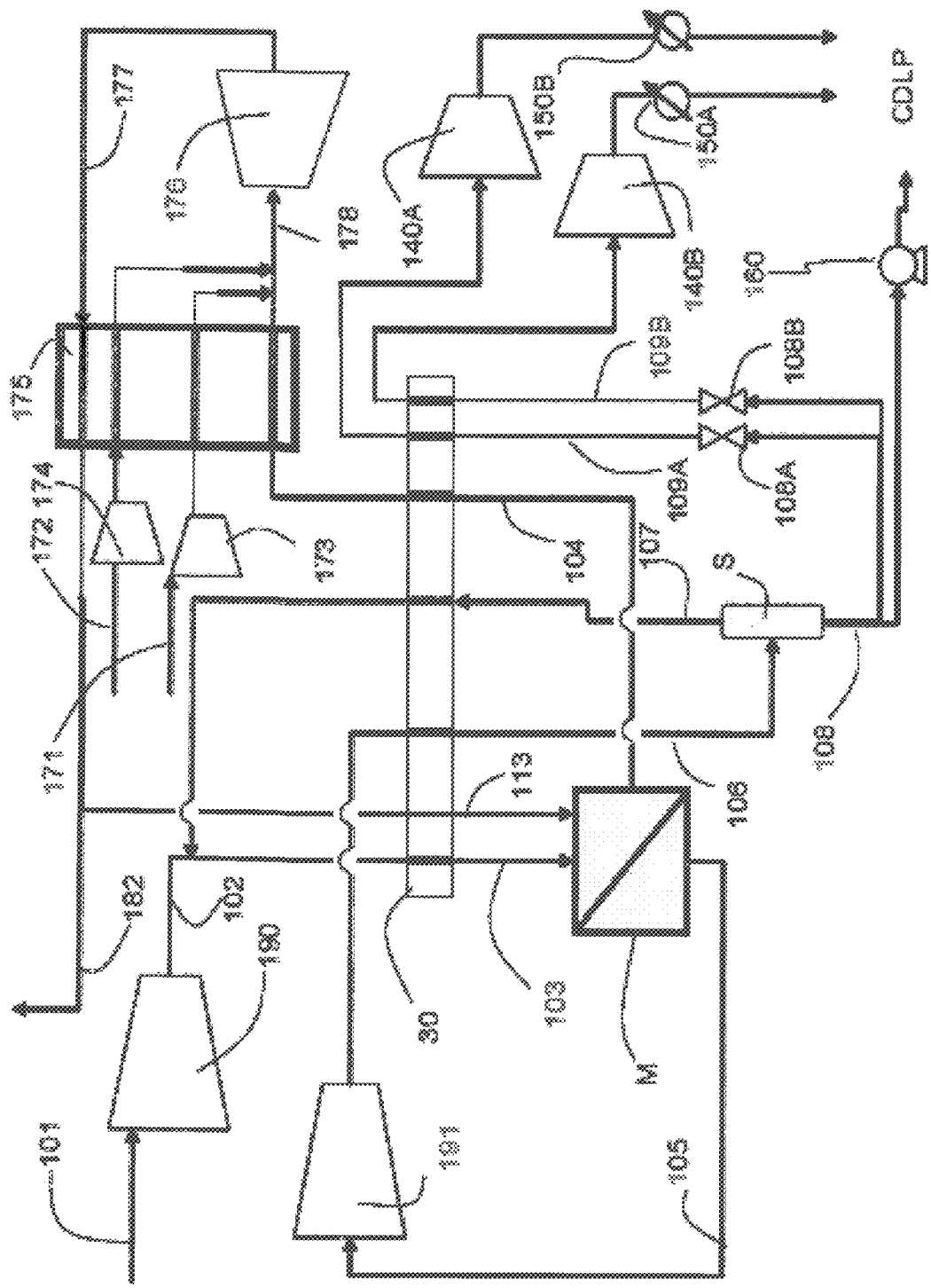
FIG. 12B is an exemplary flow diagram of a second variant of the fourth through sixth embodiments of the disclosed method.

FIG. 12B depicts an exemplary flow diagram of a variation of the fourth through sixth embodiments of the disclosed method.

The $CO_2$-containing gas mixture 101 is compressed by compressor 190 to produce a compressed $CO_2$-containing gas mixture 102. Any impurities, such as water, are removed from the compressed $CO_2$-containing gas mixture in a treatment step, such as dryer, to the level required to prevent undesired condensation in heat exchanger 30.

The dried compressed $CO_2$-containing gas mixture is cooled in heat exchanger 30. Although this embodiment schematically depicts only one heat exchanger 30, one of ordinary skill in the art will recognize that multiple heat exchangers may replace the single heat exchanger 30 schematically shown in FIG. 12B. The cooled, dried, compressed $CO_2$-containing gas mixture 103 flows into gas separation membrane M to produce a carbon dioxide-lean non-permeate 104 and a carbon dioxide-rich permeate 105 at a lower pressure.

The carbon dioxide-lean stream 104 is warmed by and provides cooling to heat exchanger 30. The warmed carbon dioxide-lean stream 104 is further warmed at heat exchanger 175. Downstream of heat exchanger 175, the twice-warmed carbon dioxide-lean stream 104, a fuel 171, and air 172 (which are compressed at compressors 173, 174, respectively) are introduced to a combustion chamber of a gas turbine 176 whereat the fuel is combusted with the oxidant in the presence of the warmed carbon dioxide-lean stream. Although the fuel 171, air 172, and twice-warmed carbon dioxide-lean stream 104 are typically separately introduced to the combustion chamber, for sake of performing a mass balance, their combination may be considered to be stream 178. The products of combustion, at enhanced pressure due to the presence of the relatively higher pressure carbon dioxide-lean stream, are expanded at the gas turbine 176 to produce mechanical energy for compression of the $CO_2$-containing gas mixture 101 or of the carbon dioxide-rich permeate 105. The expanded products of combustion 177 may be vented to atmosphere as stream 182. A portion of the expanded products of combustion 177 are cooled in the heat exchanger 30 to provide sweep gas 113 on the permeate side of the gas separation membrane M.

The carbon dioxide-rich permeate 105 is compressed at compressor 191 and cooled at heat exchanger 30. The degree of cooling at heat exchange is sufficient to partially condense $CO_2$ in the carbon dioxide-rich permeate 105. The liquid and vapor phases are then separated at separator S. The $CO_2$-lean vapor stream 107 provides cold energy for cooling the $CO_2$-containing gas mixture and partially condensing the compressed carbon dioxide-rich permeate 105. After being warmed in the heat exchanger, the $CO_2$-lean vapor stream 107 is then combined with the $CO_2$-containing gas mixture 101 downstream of compressor 190 for cooling at heat exchanger 30 and introduction to gas separation membrane M.

Additional cold energy for cooling the $CO_2$-containing gas mixture and partially condensing the compressed carbon dioxide-rich permeate 105 is provided by two portions of the carbon dioxide-rich liquid 108 that are subjected to pressure reduction at pressure reduction valves 108A, 108B to provide two portions of pressure-reduced carbon dioxide-rich liquid 109A, 109B. After being vaporized in the heat exchanger, the now-gaseous portions of carbon dioxide-rich fluid are compressed at compressors 140A, 140B, and condensed at heat exchangers 105A, 150B (cooled by cooling water) in order to provide carbon dioxide liquid product CDLP. The remainder of the carbon dioxide-rich liquid 108 is pumped at pump 160 to provide the remainder of the carbon dioxide liquid product CDLP.

The process of FIG. 12B was simulated using chemical engineering simulation software HYSIS to yield the following vapor fraction, temperature, pressure, flow, and mole fraction values recited in Table 7.

TABLE 7

Parameters for streams in process of FIG. 12B

| | | Stream # | | | | |
|---|---|---|---|---|---|---|
| | | 101 | 102 | 103 | 104 | 105 |
| Vapour Fraction | % | 100% | 100% | 100% | 100% | 100% |
| Temperature | C. | 50.00 | 6.49 | −30.00 | −32.15 | −30.00 |
| Pressure | bar a | 1.05 | 16.10 | 16.00 | 15.82 | 1.50 |
| Molar Flow | Nm³/h | 1,000 | 834 | 1,004 | 737 | 305 |
| Mass Flow | kg/h | 1,279 | 1,146 | 1,400 | 930 | 517 |
| Mole Frac ($N_2$) | % | 66.95% | 80.25% | 76.73% | 95.04% | 34.10% |
| Mole Frac ($O_2$) | % | 2.32% | 2.78% | 3.77% | 3.06% | 5.02% |
| Mole Frac (Ar) | % | 0.80% | 0.96% | 0.99% | 1.11% | 0.66% |
| Mole Frac ($CO_2$) | % | 13.30% | 15.93% | 18.51% | 0.45% | 60.21% |
| Mole Frac ($H_2O$) | % | 16.63% | 0.08% | 0.00% | 0.34% | 0.00% |
| Mole Frac ($CH_4$) | % | 0.00% | 0.00% | 0.00% | 0.00% | 0.00% |

| | | Stream # | | | | |
|---|---|---|---|---|---|---|
| | | 106 | 107 | 108 | 172 | 171 |
| Vapour Fraction | % | 56% | 100% | 0% | 100% | 100% |
| Temperature | C. | −55.00 | −55.00 | −55.00 | 20.00 | 20.00 |
| Pressure | bar a | 20.85 | 20.85 | 20.85 | 1.00 | 1.00 |
| Molar Flow | Nm³/h | 305 | 171 | 135 | 180 | 30 |
| Mass Flow | kg/h | 517 | 255 | 262 | 232 | 21 |
| Mole Frac ($N_2$) | % | 34.10% | 59.25% | 2.19% | 79.00% | 0.00% |
| Mole Frac ($O_2$) | % | 5.02% | 8.61% | 0.47% | 21.00% | 0.00% |
| Mole Frac (Ar) | % | 0.66% | 1.11% | 0.09% | 0.00% | 0.00% |
| Mole Frac ($CO_2$) | % | 60.21% | 31.03% | 97.24% | 0.00% | 0.00% |
| Mole Frac ($H_2O$) | % | 0.00% | 0.00% | 0.00% | 0.00% | 0.00% |
| Mole Frac ($CH_4$) | % | 0.00% | 0.00% | 0.00% | 0.00% | 100.00% |

| | | Stream # | | | | |
|---|---|---|---|---|---|---|
| | | 178 | 177 | 182 | 113 | 109A |
| Vapour Fraction | % | 100% | 100% | 96% | 93% | 7% |
| Temperature | C. | 1392.84 | 685.77 | 20.00 | −34.03 | −62.33 |
| Pressure | bar a | 15.65 | 1.06 | 1.01 | 1.52 | 6.00 |
| Molar Flow | Nm³/h | 947 | 947 | 909 | 38 | 67 |
| Mass Flow | kg/h | 1,184 | 1,184 | 1,136 | 47 | 131 |
| Mole Frac ($N_2$) | % | 88.98% | 88.98% | 88.98% | 88.98% | 2.19% |
| Mole Frac ($O_2$) | % | 0.04% | 0.04% | 0.04% | 0.04% | 0.47% |
| Mole Frac (Ar) | % | 0.87% | 0.87% | 0.87% | 0.87% | 0.09% |
| Mole Frac ($CO_2$) | % | 3.52% | 3.52% | 3.52% | 3.52% | 97.24% |

TABLE 7-continued

| Parameters for streams in process of FIG. 12B | | | | | | |
|---|---|---|---|---|---|---|
| Mole Frac (H₂O) | % | 6.60% | 6.60% | 6.60% | 6.60% | 0.00% |
| Mole Frac (CH₄) | % | 0.00% | 0.00% | 0.00% | 0.00% | 0.00% |

| | | Stream # | |
|---|---|---|---|
| | | 109B | CDLP |
| Vapour Fraction | % | 3% | 0% |
| Temperature | C. | −56.84 | 20.00 |
| Pressure | bar a | 11.00 | 75.00 |
| Molar Flow | Nm³/h | 67 | 135 |
| Mass Flow | kg/h | 131 | 262 |
| Mole Frac (N₂) | % | 2.19% | 2.19% |
| Mole Frac (O₂) | % | 0.47% | 0.47% |
| Mole Frac (Ar) | % | 0.09% | 0.09% |
| Mole Frac (CO₂) | % | 97.24% | 97.24% |
| Mole Frac (H₂O) | % | 0.00% | 0.00% |
| Mole Frac (CH₄) | % | 0.00% | 0.00% |

As seen in Table 7, starting with a flue gas having the above properties, the process of FIG. 12B provides a liquid product CDLP having a carbon dioxide concentration of 97.24% with little additional cooling.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of obtaining carbon dioxide from a $CO_2$-containing gas mixture, said method comprising the steps of:

flowing a $CO_2$-containing gas mixture, at a temperature which is in a range of from −20 to −50° C., into a gas separation membrane module made of a polymeric material to produce a carbon dioxide-rich stream and a carbon dioxide-lean stream, wherein the polymeric material is a polyimide polymer or copolymer having repeating units of formula (I) and/or of formula (II):

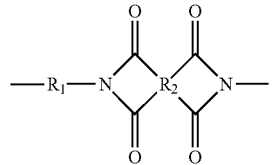

(I)

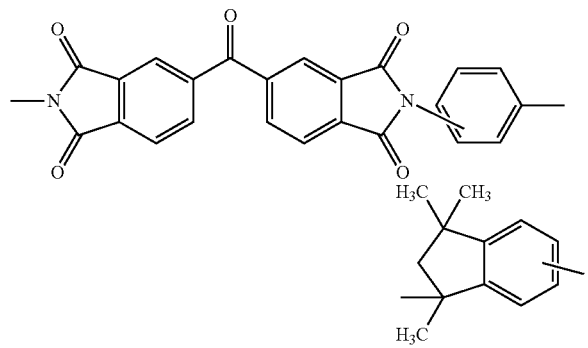

(II)

wherein:

each $R_2$ is a moiety of formula (C)

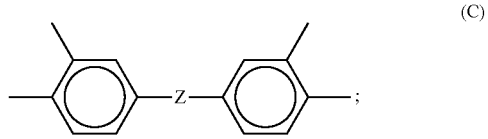

(C)

each Z is a moiety independently selected from the group consisting of formula (L), formula (M), formula (N) and/or a mixture thereof

(L)

80% of the $R_1$'s are the molecular segment of formula (a) and 20% of the $R_1$'s are the molecular segment of formula (c)

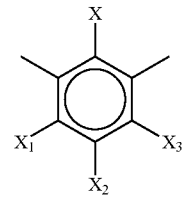

(a)

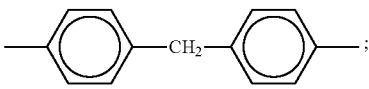

(c)

each X, $X_1$, $X_2$, and $X_3$ is independently selected from the group consisting of hydrogen and an alkyl group having 1 to 6 carbon atoms;

the membrane exhibits a permeability of oxygen in Barrers of less than $2000/(\text{selectivity})^{3.5}$ for a gas mixture of 80 mole percent nitrogen and 20 mole percent oxygen at a temperature of 30° C. and at a pressure on one side of the membrane of 30 psia with a vacuum of less than 1 mm Hg on the other side of the membrane, selectivity being the selectivity of oxygen to nitrogen selectivity;

the polymeric material has a $CO_2$ solubility at 35° C. and 10 bar pressure of >0.03[cm$^3$(STP)/cm$^3$(polymer)–cmHg] and a glass transition temperature of >210° C.; and the gas separation module is conditioned by allowing the $CO_2$-containing gas mixture to flow into the gas separation membrane module for at least 100 hours and a $CO_2$ flux is realized at said temperature range at at least 100 hours is at least 87.4% of a $CO_2$ flux at room temperature.

2. The method of claim 1, wherein the $CO_2$-containing gas mixture is at a pressure from about 3 bar to about 60 bar.

3. The method of claim 1, wherein the $CO_2$-containing gas mixture is obtained from the flue gas of a combustion process, from a natural gas stream, or from a $CO_2$ exhaust of an fermentative ethanol production plant.

4. The method of claim 3, the $CO_2$-containing gas mixture is obtained from the flue gas of a combustion process and the combustion process is selected from the group consisting of a steam methane reforming (SMR) process, a blast furnace, and air-fired or oxygen-enhanced fossil fuel combustion processes.

5. The method of claim 4, wherein the combustion process is an oxygen-enhanced fossil fuel combustion process operated in full oxycombustion or partial oxycombustion mode.

6. The method of claim 5, wherein the oxygen-enhanced fossil fuel combustion process is operated in full oxycombustion mode, primary and secondary oxidants thereof being pure oxygen or synthetic air comprising oxygen and recycled flue gas.

7. The method of claim 5, wherein the oxygen-enhanced fossil fuel combustion process is operated in partial oxycombustion mode, a primary oxidant thereof being air and a secondary oxidant thereof being synthetic air comprising oxygen and recycled flue gas.

8. The method of claim 4, wherein the combustion process is an air-fired fossil fuel combustion process, the fossil fuel is coal, and the $CO_2$-containing gas mixture comprising about 8% v/v to about 16% v/v $CO_2$.

9. The method of claim 4, wherein the combustion process is an air-fired fossil fuel combustion process, the fossil fuel is natural gas, and the $CO_2$-containing gas mixture comprising about 3% v/v to about 10% v/v $CO_2$.

10. The method of claim 6, wherein the $CO_2$-containing gas mixture comprising about 60% v/v to about 90% v/v $CO_2$.

11. The method of claim 4, wherein the combustion process is a steam methane reforming (SMR) process, and the $CO_2$-containing gas mixture comprises about 15% v/v to about 90% v/v $CO_2$.

12. The method of claim 4, wherein the combustion process is a blast furnace, and the $CO_2$-containing gas mixture comprises about 20% v/v to about 90% v/v $CO_2$.

* * * * *